United States Patent [19]

Yamano et al.

[11] Patent Number: 4,507,721
[45] Date of Patent: Mar. 26, 1985

[54] DC-DC CONVERTER FOR REMOTE POWER FEEDING

[75] Inventors: Seiichi Yamano, Yokosuka; Haruo Ogiwara, Higashimurayama, both of Japan

[73] Assignee: Nippon Telegraph & Telephone Public Corporation, Tokyo, Japan

[21] Appl. No.: 515,754

[22] Filed: Jul. 21, 1983

[30] Foreign Application Priority Data

Jul. 28, 1982 [JP] Japan ................................ 57-132364
Jul. 28, 1982 [JP] Japan ................................ 57-132365

[51] Int. Cl.³ .......................................... H02N 3/335
[52] U.S. Cl. ..................................... 363/21; 363/40; 363/45
[58] Field of Search ...................... 363/18, 19, 20, 21, 363/22, 23, 24, 25, 26, 126, 39, 40, 45, 46; 336/84 C, 84 M

[56] References Cited

U.S. PATENT DOCUMENTS

| 3,936,719 | 11/1973 | Miyoshi et al. | 363/126 |
| 4,089,049 | 5/1978 | Suzuki et al. | 363/84 C |
| 4,335,423 | 6/1982 | Koizumi et al. | 363/21 |
| 4,406,978 | 9/1983 | Goseberg et al. | 363/126 |

FOREIGN PATENT DOCUMENTS

| 3004000 | 8/1981 | Fed. Rep. of Germany | 363/20 |
| 52-3132 | 11/1977 | Japan | 363/18 |
| 56-25384 | 3/1981 | Japan | 363/21 |
| 56-148179 | 11/1981 | Japan | 363/21 |

OTHER PUBLICATIONS

Toshiyuki Sugiura et al. Power Feed Equipment for Medium/Small Capacity Optical Fiber Transmission Systems, Kenkyu Jitsuyoka Hokoku (E.C.L. Tech. Jour.), NTT, Japan, vol. 30, No. 9, pp. 2247-2256, 1981.

Primary Examiner—Peter S. Wong
Assistant Examiner—Judson H. Jones
Attorney, Agent, or Firm—Pollock, Vande Sande and Priddy

[57] ABSTRACT

A floating type DC-DC converter for remote power feeding is connected via a power separating filter to a signal line on which an AC signal is superimposed on DC power. The DC power separated by the power separating filter is stored in an input capacitor and is supplied by a switching operation of a switching element to the primary winding of a transformer and AC power induced in its secondary winding is supplied to an output capacitor after being rectified by a rectifying element. An electrostatic shield layer is interposed between the primary and secondary windings of the transformer and is connected to the capacitor connected to one of the primary and secondary windings. Rectifying element or switching element connecting means is provided by which an AC voltage induced in the winding portion on one side of the center winding point of the other of the primary and secondary windings and an AC voltage induced in the winding portion on the other side of the center winding point of said other winding are made substantially symmetrical with respect to the center winding point, opposite in polarity and substantially equal in amplitude to each other.

4 Claims, 27 Drawing Figures

DC-DC CONVERTER FOR REMOTE POWER FEEDING

BACKGROUND OF THE INVENTION

The present invention relates to a DC-DC converter for remote power feeding which is connected via a power separating filter to a signal line on which a bit stream signal is superimposed on DC power. In the DC-DC converter an input DC power supplied thereto is switched at a high frequency and applied to the primary winding of a transformer. The power induced in the secondary winding of the transformer is rectified to obtain an output DC voltage different from the input DC voltage.

In such a conventional DC-DC converter, switching on the input side causes abrupt changes in current and voltage, which interact with the stray capacitance of a transformer, the inductances of lead wires and so forth to generate internal common mode noise, that is, a potential difference between the input side and the output side. In an ordinary DC-DC converter, however, the primary and secondary sides of the transformer are grounded to the same potential point, so that internal common mode noise is suppressed. It has been proposed that in the case where the primary and secondary sides of the transformer cannot be grounded in common, the primary and secondary sides are interconnected by a noise suppressing capacitor to reduce the impedance between them.

A remote power feeding DC-DC converter, which is used as a power feeding source or receiving sink in the case of operating a digital line terminating equipment in a subscriber's premises by power feeding from the central office in a digital subscriber line transmission system, is connected via a power separating filter to a signal line on which a bit stream signal is superimposed on DC power. It has been clarified that, in such a case, if the input and output sides of the DC-DC converter are grounded in common, or if a noise suppressing capacitor is connected between the input and output sides, the inductance of the power separating filter and input and output capacitors of the DC-DC converter or the noise suppressing capacitor resonate with each other, by which the common mode rejection ratio of the digital line terminating equipment is reduced and the externally induced common mode noise (i.e. noise with respect to ground potential) is converted into a differential mode noise (i.e. noise induced between lines), which enters into an equalizing amplifier. Accordingly, in the case where an analog telephone line is incorporated in the cable in which the signal line having connected thereto the DC-DC converter is housed, noise resulting from polarity inversion of an exchange of the analog telephone line is induced as the external common mode noise in the signal line connected to the DC-DC converter, and causes a code error. The influence of such external common mode noise could be avoided by making the DC-DC converter float off ground both DC-wise and AC-wise, that is, providing a sufficiently high impedance against the external common mode noise. In this case, however, switching of the DC-DC converter itself produces the common mode noise, causing a code error.

SUMMARY OF THE INVENTION

It is therefore an object of the present invention to provide a DC-DC converter for remote feeding which is free from the generation of the internal common mode noise by switching as well as the influence of the external common mode noise.

In accordance with an aspect of the present invention, the input and output sides of the transformer are made to float off ground and an electrostatic shield layer is interposed between the primary and secondary windings of the transformer and connected to a capacitor on the side of one of the primary and secondary windings. Moreover, rectifying or switching element balancing means is provided by which an AC voltage potential induced in a half winding portion of the primary or secondary winding on one side of the center winding point relative to the one terminal of the capacitor in the input or output side and an AC voltage potential induced in the other half winding portion of the abovesaid winding are made symmetrical with respect to the center winding point, opposite in polarity and substantially equal in amplitude to each other. For example, the electrostatic shield layer is connected to the junction between the primary winding and the input capacitor to prevent the generation of the common mode noise which results from a switching voltage developed in the primary winding. Furthermore, the secondary winding is divided at the center winding point thereof into two and a rectifying element is connected in series to the divided two winding portions and stray capacitances of the winding portions of the secondary winding on both sides of the rectifying element are differentially activated to be balanced, thereby suppressing the common mode noise which results from a switching noise induced in the secondary winding.

In accordance with another aspect of the present invention, a first electrostatic shield layer is interposed between the primary and secondary windings of the transformer and connected to the input capacitor to prevent the generation of the common mode noise which is caused by the switching voltage induced in the primary winding.

In addition, a second electrostatic shield layer is interposed between the first electrostatic shield layer and the secondary winding and connected to the output capacitor to prevent the generation of the common mode noise which is caused by the switching voltage induced in the secondary winding.

DESCRIPTION OF THE PREFERRED EMBODIMENTS

A description will be given first of the digital subscriber line transmission system to which the DC-DC converter of the present invention can be applied, then of a conventional DC-DC converter and its disadvantages and finally of embodiments of the present invention.

Figure 1:
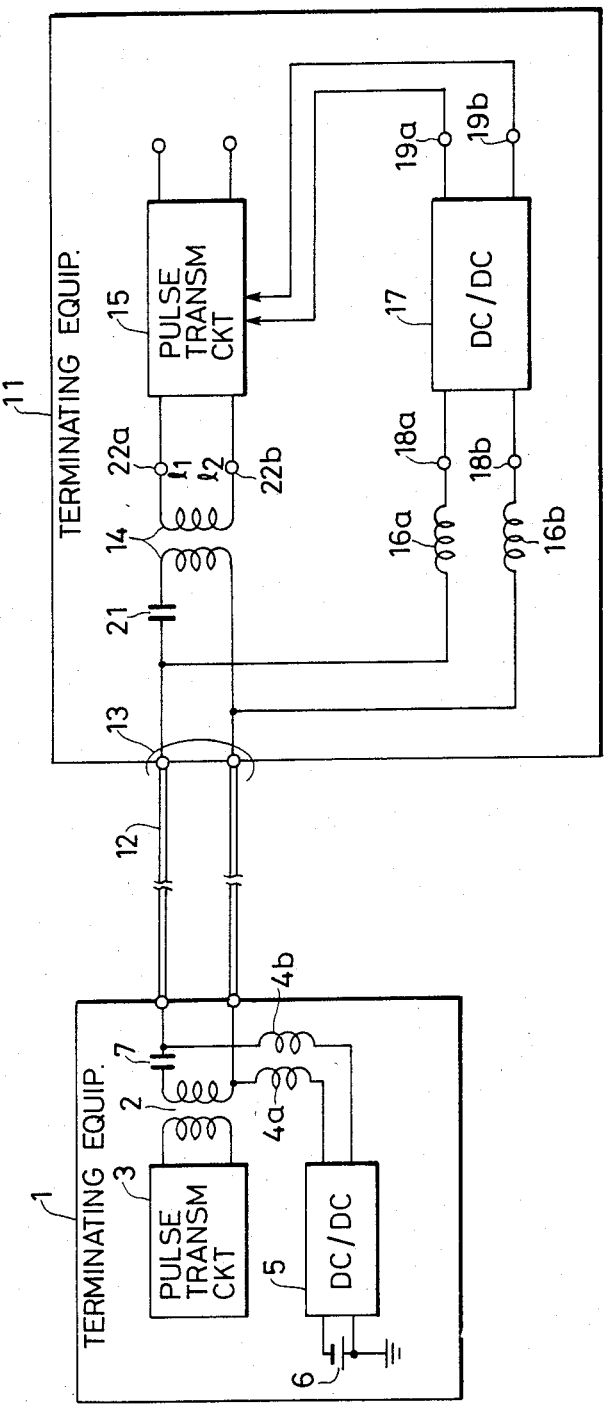
FIG. 1 is a block diagram showing a prior art subscriber line transmission system.

FIG. 1 shows a subscriber line transmission system, in which a digital line terminating equipment 11 installed in a subscriber's premises is usually arranged to be activated by remote power feeding from the central office and, on a subscriber's line 12 of a balanced type cable connected at one end to the digital line terminating equipment 11, a digital signal is superimposed on DC for power feeding. The other end of the subscriber's line 12 is led into the central office and connected to a digital line terminating equipment 1 therein. In the digital line terminating equipment 1 the subscriber's line 12 is connected via a transformer 2 to a pulse transmission circuit 3 and, at the same time, it is connected via power separating filters 4a and 4b to the output side of a DC-DC converter 5, to the input side of which is connected a battery 6. A DC blocking capacitor 7 is connected between the transformer 2 and the subscriber's line 12. The power of the battery 6 is voltage converted by the DC-DC converter 5 and provided to the subscriber's line 12. The digital signal on the subscriber's line 12 is input to a pulse transmission circuit 15 via a junction 13 between the line 12 and the equipment 11, and a transformer 14. The pulse transmission circuit 15 comprises an equalizing amplifier, a pulse transmitter and so forth although not shown in the figures. The DC for power feeding on the subscriber's line 12 is input via the junction 13 and power separating filters 16a and 16b to the input terminals 18a and 18b of a DC-DC converter 17, across which is applied, for example, a DC voltage of 30 V. The DC-DC converter 17 carries out a DC-DC conversion of the input voltage to produce across its output terminals 19a and 19b a DC voltage of 5 V, for instance. The principal or entire part of the digital line terminating equipment 11 operates on the output power derived across the output terminals 19a and 19b of the DC-DC converter 17. A DC blocking capacitor 21, which is connected between the junction 13 and the transformer 14, is provided for preventing the DC for power feeding from flowing into the transformer 14. The power separating filters 16a and 16b are each formed, for example, by a coil so that it may produce a low resistance for a DC current and a high impedance for an AC current. This is intended to avoid short-circuiting of the digital signal since the impedance across the input terminals 18a and 18b of the DC-DC converter 17 is low.

In the case of using a conventional DC-DC converter as the DC-DC converter 17 which serves as the power source for the digital line terminating equipment 11 of the above arrangement, the following defects are encountered.

(a) Between the input and output sides of the DC-DC converter 17, that is, between the input terminal 18a and the output terminal 19a, or between the input terminal 18b and the output terminal 19b, there is generated a switching noise $v_1$ resulting from switching of the DC-DC converter 17, i.e. what is called internal common mode switching noise. The common mode switching noise is converted into a differential mode noise in accordance with the common mode rejection ratio (CMRR) which is determined by the subscriber's line 12 and the digital line terminating equipment 11 and the differential mode noise appears between output terminals 22a and 22b of the transformer 14, causing a code error of the digital signal. To avoid this, it is necessary that the generation of the common mode switching noise be sufficiently suppressed but the prior art DC-DC converter cannot fulfill this requirement.

Figure 2:
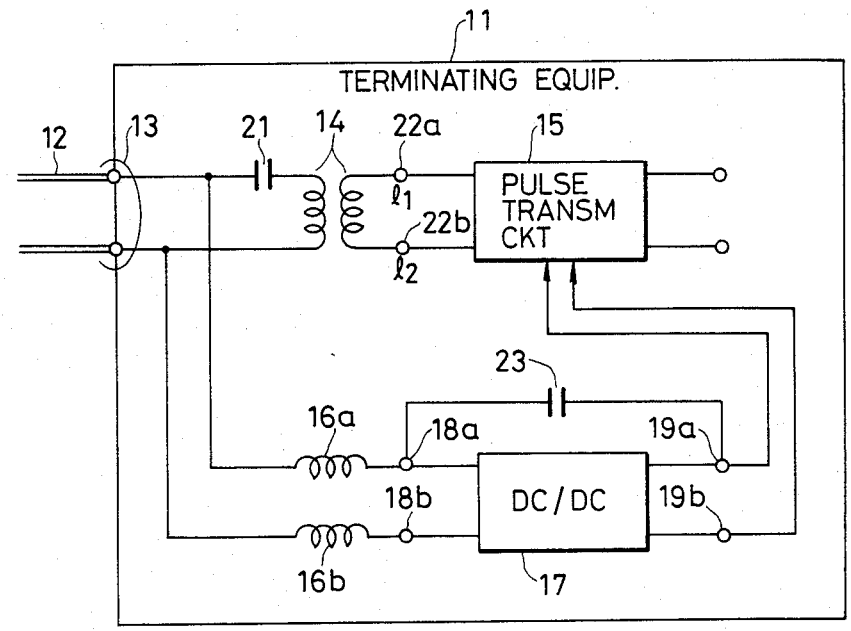
FIG. 2 is a block diagram showing digital line terminating equipment installed in a subscriber's premises, which is provided with conventional switching noise suppressing means.

(b) An analog telephone line is housed in the same cable, along with the subscriber's line 12 and, in this case, a polarity inversion of an exchange in the analog telephone line induces an impulsive common mode noise of a large amplitude in the subscriber's line 12. In this way, such impulsive noise and various other common mode noises are induced in the subscriber's line 12 from the analog telephone line to cause a code error of the digital signal, so that the common mode rejection ratio of the digital line terminating equipment 11 must be selected sufficiently large. To obviate the defect mentioned above in (a), it has been proposed to employ an arrangement of the type shown in FIG. 2 in which an externally connected capacitor 23, which exhibits a low impedance at the switching frequency of the DC-DC converter 17, is connected between the input terminal 18a and the output terminal 19a (or between 18b and 19b) of the DC-DC converter 17, thereby to suppress the generation of the internal common mode switching noise. With such an arrangement, however, when the output terminal 19a or 19b of the DC-DC converter 17 is grounded with a low impedance (usually arranged so), the coil of the power separating filter 16a (or 16b) and the externally connected capacitor 23 are cascade connected to form a resonance circuit and, at its resonance frequency, the resonance circuit becomes low in impedance to extremely reduce the common mode rejection ratio of the digital line terminating equipment 11, resulting in a code error with respect to external noise. To avoid this, it is necessary that the resonance frequency of the resonance circuit be set to a frequency sufficiently higher than the pulse transmission frequency band. This requires the removal of the externally connected capacitor 23 and the isolation of the input terminals 18a and 18b from the output terminals 19a and 19b of the DC-DC converter 17 by a high impedance substantially equal to the stray capacitance of the transformer 14. With the conventional circuit arrangement, however, this introduces the defect referred to above in (a).

A more detailed description will be given of these points.

Figure 3:
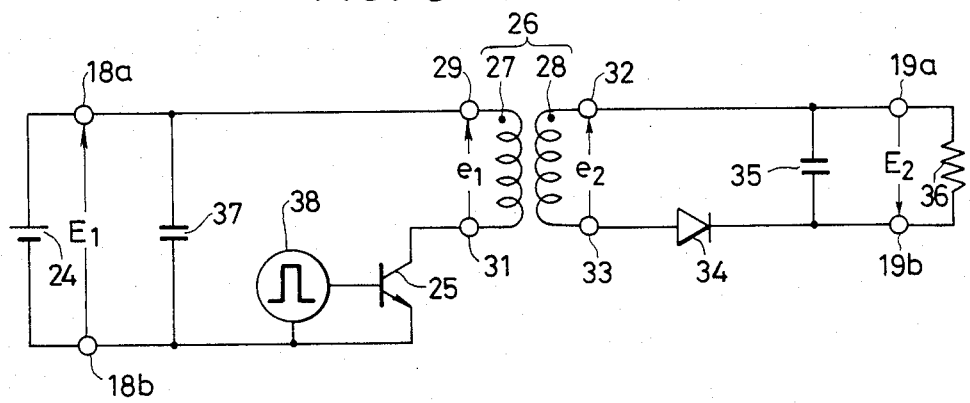
FIG. 3 is a connection diagram showing the basic arrangement of a conventional ON-OFF type DC-DC converter.

FIG. 3 illustrates the basic structure of the prior art DC-DC converter. An input DC voltage $E_1$, which is supplied from a DC power source 24 to the DC-DC converter across the input terminals 18a and 18b thereof, is converted by the repetitive ON-OFF operation (hereinafter referred to as the switching) of a switching element 25 into an alternating voltage (hereinafter referred to as the switching voltage), producing a switching voltage $e_1$ across a primary winding 27 of a transformer 26. As a consequence, a switching voltage $e_2$ is induced across a secondary winding 28 of the transformer 26. The switching voltage $e_2$ is half-wave rectified by a rectifying element, for instance, a diode 34 and the rectified output is smoothed by an output capacitor 35 to obtain thereacross a DC output voltage $E_2$, which is provided to a load 36 via the output terminals 19a and 19b of the DC-DC converter. Incidentally, the ratio between the switching voltages $e_1$ and $e_2$ induced across the primary and secondary windings 27 and 28 of the transformer 26, respectively, is dependent upon the winding ratio between the primary and secondary windings 27 and 28. An input capacitor 37 is connected across the DC power source 24 and the switching element 25 is, for example, a transistor, which is connected in series with the primary winding 27 of the transformer 26, and a driver 38 is connected between the base and emitter of the transistor 25.

Figure 4:
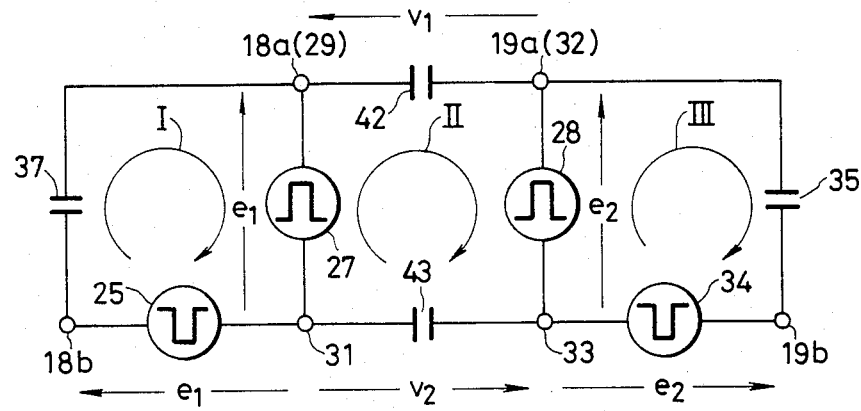
FIG. 4 is a diagram which explains the common mode switching noise generating mechanism in the DC-DC converter of FIG. 3.

The conventional DC-DC converter shown in FIG. 3 possesses the shortcoming that a large switching voltage is generated between the input and output sides, that is, between the input terminal 18a and the output terminal 19a. The switching voltage will hereinafter be referred to as the common mode switching noise, which will be described hereinbelow with reference to FIG. 4. FIG. 4 illustrates a common mode switching noise generating mechanism in the DC-DC converter of FIG. 3, noting the AC components of the noise. In FIG. 4, the same reference numerals as those in FIG. 3 indicate like components; $e_1$, $e_2$, $v_1$ and $v_2$ each identify a switching voltage between respective terminals at a given time point and the arrows indicate the interrelation of the polarity of the respective voltages. The junction between the switching element 25 and the power source 24 is used as the input terminal 18b and the junction between the diode 34 and the output capacitor 35 is used as the output terminal 19b. A capacitor 42 between the winding ends 29 and 32 and a capacitor 43 between the winding ends 31 and 33 each represent a lumped approximation of stray capacitances distributed between the primary and secondary windings 27 and 28. Closed circuits, which are respectively formed by the switching element 25, the primary winding 27 and the input capacitor 37, by the primary winding 27, the secondary winding 28 and the capacitors 42 and 43 and by the secondary winding 28 and the diodes 42 and 43, will hereinafter be referred to as closed circuits I, II and III, respectively.

Reference is made first to the closed circuit I. The input capacitor 37 acts as a short (a sufficiently low impedance) with respect to the switching frequency component, and hence does not produce thereacross a switching voltage. Accordingly, a switching voltage, which is equal in amplitude but opposite in polarity to the switching voltage $e_1$ induced across the primary winding 27, is generated across the switching element 25 through Kirchhoff's voltage law. Referring next to the closed circuit III, the output capacitor 35 acts as a short with respect to the switching frequency component, and hence does not generate thereacross a switching voltage. Accordingly, a switching voltage, which is equal in amplitude but opposite in polarity to the switching voltage $e_2$ induced across the secondary winding 28, is generated across the diode 34 through Kirchhoff's voltage law.

Figure 5:
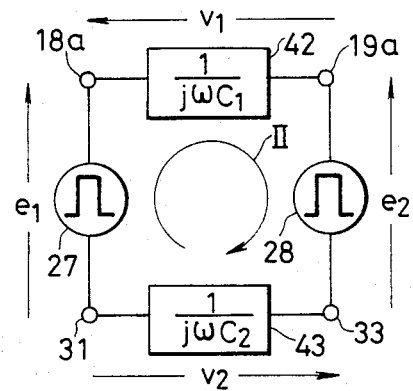
FIG. 5 is an enlarged diagram of a closed circuit II in FIG. 4.

Referring now to the closed circuit II, the capacitors 42 and 43 are both usually small in capacitance value and exhibit sufficiently high impedances over a high-frequency range including the switching frequency. In the closed circuit II, letting switching voltages generated across the capacitors 42 and 43 be represented by $v_1$ and $v_2$, respectively, they satisfy a relation, $v_1 + v_2 = e_1 - e_2$, through Kirchhoff's voltage law. Further, the ratio between the voltages $v_1$ and $v_2$ is in inverse proportion to the capacitance values of the capacitors 42 and 43. The switching voltage $v_1$ generated across the capacitor 42 is the common mode switching noise. This will be described with reference to FIG. 5 which shows the closed circuit II on an enlarged scale. In FIG. 5 the same reference numerals as those in FIG. 4 indicate like components. The capacitance values of the capacitors 42 and 43 will hereinafter be identified by $C_1$ and $C_2$, respectively. The amplitude value $v_1$ of the common mode switching noise becomes as follows:

$$v_1 = \frac{C_2}{C_1 + C_2}(e_1 - e_2) \qquad (1)$$

The common mode switching noise is produced under the influence of both of the switching voltage $e_1$ generated across the primary winding 27 and the switching voltage $e_2$ generated across the secondary winding 28. Since an ordinary DC-DC converter is to yield the output DC voltage $E_2$ different from the input DC voltage $E_1$, $e_1 \neq e_2$. Consequently, in order to isolate the input terminals 18a and 18b from the output terminals 19a and 19b with a high impedance and to suppress the generation of the common mode switching noise, the capacitance value $C_2$ of the capacitor 43 must be decreased sufficiently smaller than the capacitance value $C_1$ of the capacitor 42. But the capacitance value $C_2$ of the capacitor 43 is determined by the primary and secondary windings 27 and 28 and the configuration of the core of the transformer 26, and it cannot be made appreciably small. On the other hand, an increase in the capacitance value $C_1$ of the capacitor 42 (for example, by the provision of the externally connected capacitor 23 in FIG. 2) decreases the common mode switching noise but it causes resonance between the capacitor 42 and the power separating filter 16a (or 16b) and, at the resonance frequency, the impedance at the input point 13 of the digital line terminating equipment 11 becomes low, resulting in the common mode rejection ratio being reduced.

Figure 6:
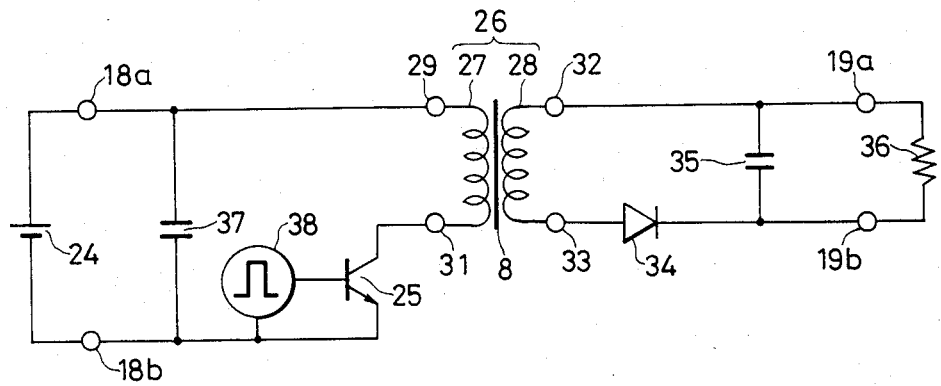
FIG. 6 is a connection diagram showing a prior art example of a DC-DC converter having an electrostatic shield layer interposed between the primary and secondary windings of a transformer.
Figure 7:
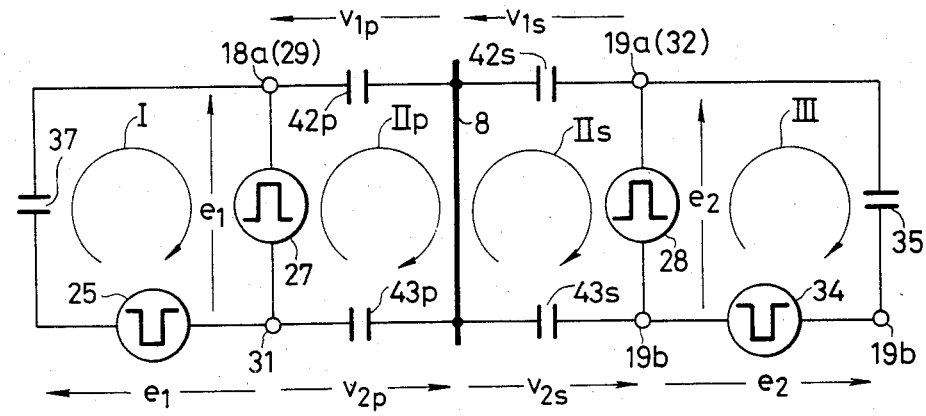
FIG. 7 is a diagram explanatory of the mechanism of generating the common mode switching noise in the DC-DC converter of FIG. 6.

It is a general practice in the art to interpose an electrostatic shield layer between the primary and secondary windings for isolating the input and output sides from each other with a high impedance but this cannot reduce the common mode switching noise. FIG. 6 shows such an arrangement of a shield layer, where an electrostatic shield layer 8 is interposed between the primary and secondary windings 27 and 28. FIG. 7 shows an equivalent circuit of the FIG. 6 circuit for AC current in the same manner as in FIG. 4. Capacitors 42p and 43p each indicate a lumped parameter approximation of the stray capacitance between the primary winding 27 and the electrostatic shield layer 8. Similarly, capacitors 42s and 43s each indicate a lumped parameter approximation of the stray capacitance between the secondary winding 28 and the electrostatic shield layer 8. A closed circuit formed by the primary winding 27, the capacitor 42p, the electrostatic shield layer 8 and the capacitor 43p will hereinafter be referred to as the closed circuit IIp, and a closed circuit formed by the secondary winding 28, the capacitor 43s, the electrostatic shield layer 8 and the capacitor 42s will hereinafter be referred to as the closed circuit IIs. Letting the capacitance values of the capacitors 42p, 42s, 43p and 43s be represented by $C_{1p}$, $C_{1s}$, $C_{2p}$ and $C_{2s}$, respectively, it will be understood that a voltage $v_{1p}$ across the capacitor 42p in the closed circuit IIp is as follows:

$$v_{1p} = \frac{C_{2p}}{C_{1p} + C_{2p}} e_1.$$

It will be seen that a voltage $v_{1s}$ across the capacitor 42s in the closed circuit IIs is as follows:

$$v_{1s} = \frac{-C_{2s}}{C_{1s} + C_{2s}} e_2.$$

The common mode switching noise is a voltage between the terminals 18a and 19a and it is given by $$v_{1p} + v_{1s} = \frac{C_{2p}}{C_{1p} + C_{2p}} e_1 - \frac{C_{2s}}{C_{1s} + C_{2s}} e_2.$$

Generally, $C_{1p} \simeq C_{2p}$ and $C_{1s} \simeq C_{2s}$ and, in such a case, $$v_{1p} + v_{1s} = \tfrac{1}{2}(e_1 - e_2)$$

Since $e_1 \neq e_2$, the common mode switching noise cannot be reduced.

For the reasons given above, it has been difficult with the prior art to isolate the input terminals 18a and 18b from the output terminals 19a and 19b by a high impedance and to reduce the common mode switching noise. For instance, in the DC-DC converter of the FIG. 3 arrangement in which the DC input voltage $E_1$ is 30 V, the DC output voltage $E_2$ is 5 V and the output power is about 1 W, the common mode switching noise produced is about 10 Vpp in terms of a ripple component excluding a surge component. This noise value slightly differs with the primary and secondary winding structures.

Figure 8:
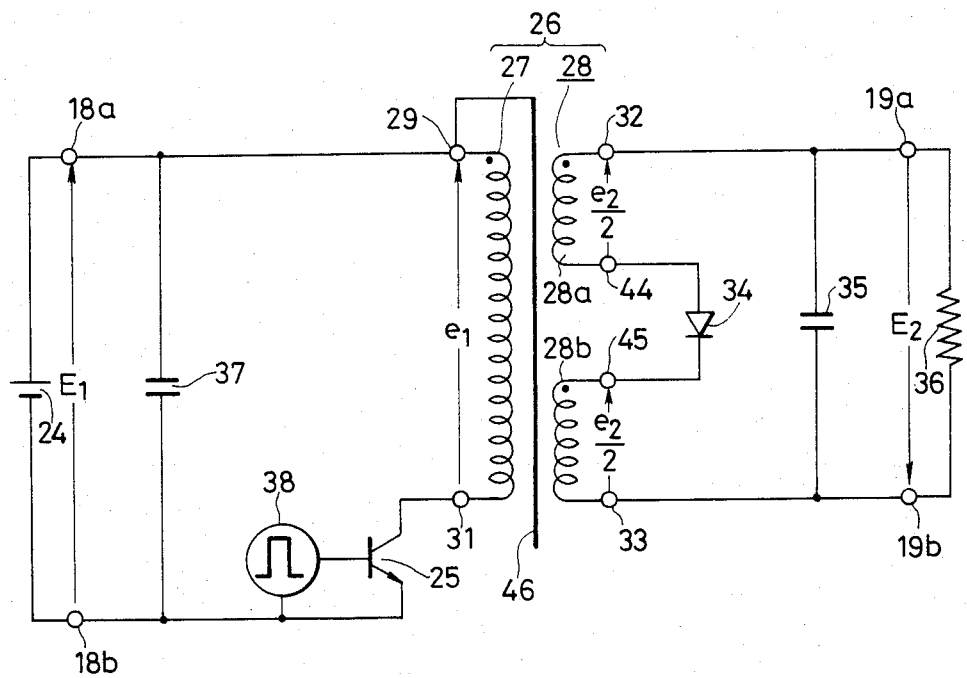
FIG. 8 is a connection diagram illustrating an embodiment of the present invention as being applied to an ON-OFF type DC-DC converter in which balancing means is provided on the output side.

FIG. 8 illustrates a first embodiment of the present invention. In this embodiment the secondary winding 28 is opened at its center winding point and divided into two winding portions 28a and 28b, and a half-wave rectifying element, for instance, a diode 34 is connected between their open ends 44 and 45, forming balancing means. Interposed between the primary winding 27 and the secondary windings 28a and 28b is an electrostatic shield layer 46, which is connected to the primary winding 27 on the side on which the input capacitor 37 is connected to the primary winding 27, that is, to the input terminal 18a which is an equi-potential point in terms of AC voltage (hereinafter referred to as the static end). The input terminal 18b is also a static end and even if the electrostatic shield layer 46 is connected to the input terminal 18b, the results would be the same. The other reference numerals and characters are the same as those in FIG. 3. On account of such an arrangement, this embodiment possesses the function of reducing the switching voltage which is yielded between the input terminal 18a and the output terminal 19a, that is, the common mode switching noise as will be described herein below.

In the case of the conventional DC-DC converter shown in FIG. 3, the common mode switching noise is produced under the influence of both of the switching voltages $e_1$ and $e_2$ induced across the primary and secondary windings 27 and 28, respectively, as seen from Eq. (1). In the embodiment of FIG. 8, however, (i) owing to the provision of the electrostatic shield layer 46 between the primary winding 27 and the secondary windings 28a and 28b and the connection of the shield layer 46 to the input terminal 18a which is the static end of the primary winding 27, the switching voltage $e_1$ across the primary winding 27 is not produced as the voltage (the common mode switching noise) between the input terminal 18a and the output terminal 19a. (ii) Furthermore, owing to the connection of the half-wave rectifying diode 34 between the divided secondary winding portions 28a and 28b, a switching voltage developed between the one end 19a of the output capacitor 35 and a given point between the terminals 32 and 44 of the secondary winding portion 28a and a switching voltage developed between the other end 19b of the output capacitor 35 and a given point between the terminals 33 and 45 of the secondary winding portion 28b are made symmetrical with respect to the center taps 44 and 45, opposite in polarity and substantially equal in amplitude to each other. In this case, since both ends 19a and 19b of the output capacitor 35 and the output ends 32 and 33 of the secondary winding 28 are respectively at equi-potential points, and since the half-wave rectifying element 34 is connected to the center taps 44 and 45 of the secondary winding 28, the switching voltage induced in one of the secondary winding portions 28a and 28b with respect to the electrostatic shield layer 46 is equal to the opposite of the induced switching voltage in the other secondary winding portion. Therefore, the effect of the switching voltages is canceled out. As a result of this, the switching voltage $e_2/2$ which is yielded across each of the secondary winding portions 28a and 28b is not developed as the voltage (the common mode switching voltage) between the input and output terminals 18a and 19a.

Figure 9:
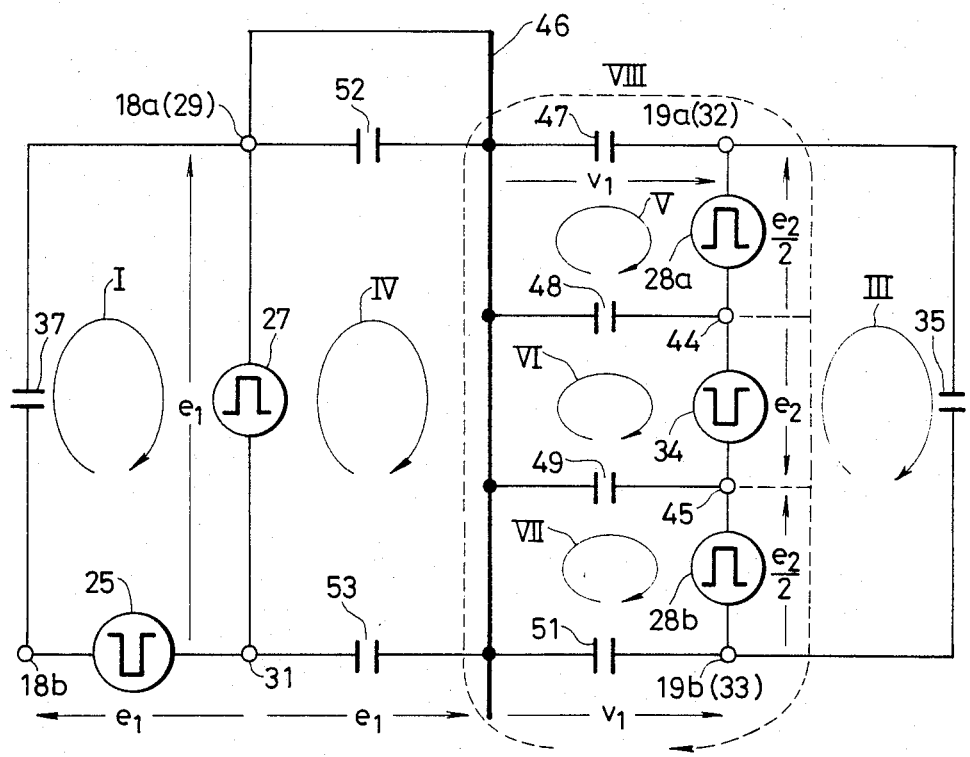
FIG. 9 is a diagram explanatory of the common mode switching noise reducing action in the DC-DC converter of FIG. 8.

This will be described in greater detail in connection with FIG. 9. FIG. 9 shows the common mode switching noise reducing action in the DC-DC converter of FIG. 8, noting the AC component. In FIG. 9 reference numerals and characters are the same as those in FIG. 5, $e_1$, $e_2$ and $v_1$ each indicate a switching voltage between the respective terminals at a given time point and the arrows indicate the interrelation of the polarity of the voltages. Capacitors 47 and 48 each indicate, in the form of a lumped parameter, an approximation of the stray capacitance distributed between the secondary winding portion 28a and the electrostatic shield layer 46, the capacitors 47 and 48 being respectively connected between both ends 32 and 44 of the secondary winding portion 28a and the electrostatic shield layer 46. Likewise, capacitors 49 and 51 each indicate, in the form of a lumped parameter, an approximation of the stray capacitance distributed between the secondary winding portion 28b and the electrostatic shield layer 46, the capacitors 49 and 51 being respectively connected between both ends 45 and 33 of the secondary winding portion 28b and the electrostatic shield layer 46. Capacitors 52 and 53 each indicate, in the form of a lumped parameter, an approximation of the stray capacitance distributed between the primary winding 27 and the electrostatic shield layer 46, the capacitors 52 and 53 being respectively connected between both ends 29 and 31 of the primary winding 27 and the electrostatic shield layer 46. A closed circuit formed by the input capacitor 37, the primary winding 27 and the switching element 25, a closed circuit formed by the primary winding 27, the capacitors 52 and 53 and the electrostatic shield layer 46, a closed circuit formed by the secondary winding 28a, capacitors 47 and 48 and the electrostatic shield layer 46, a closed circuit formed by the diode 34, the capacitors 48 and 49 and the electrostatic shield layer 46, a closed circuit formed by the secondary winding portions 28a and 28b, the diode 34, the capacitors 47 and 51 and the electrostatic shield layer 46 and a closed circuit formed by the secondary winding portions 28a and 28b, the diode 34 and the output capacitor 35 will hereinafter be referred to as closed circuits I, IV, V, VI, VII, VIII and III, respectively.

A description will be given first of the matter mentioned above in (i). Reference is made first to the closed circuit I in FIG. 9. Since the input capacitor 37 acts as a short (a sufficiently low impedance) with respect to the switching frequency component, no switching voltage is produced across the input capacitor 37. Accordingly, through Kirchhoff's voltage law, a switching voltage equal in amplitude but opposite in polarity to the switching voltage $e_1$ induced across the primary winding 27 is produced across the switching element 25. Referring next to the closed circuit IV, since both ends of the capacitor 52 are short-circuited by the electrostatic shield layer 46, no switching voltage is yielded. Accordingly, in the closed circuit IV, there is developed across the capacitor 53 a switching voltage equal in amplitude and opposite in polarity to the switching voltage $e_1$ induced across the primary winding 27 through Kirchhoff's voltage law. From the above it will be appreciated that the switching voltage $e_1$ developed on the input side is confined thereto by the electrostatic shield layer 46 and does not exert influence on the voltage between the input terminal 18a and the output terminal 19a.

Next, a description will be given of the matter mentioned previously in (ii). Reference is made to the closed circuit III in FIG. 9. The output capacitor 35 acts as a short with respect to the switching frequency component, and hence it generates no switching voltage thereacross. Since the secondary winding 28 is divided into two at the center taps 44 and 45, switching voltages $e_2/2$ of the same amplitude and the same polarity are induced across the secondary winding portions 28a and 28b. In consequence, a switching voltage equal in amplitude to the sum $e_2$ of the switching voltages induced across the secondary winding portions 28a and 28b is developed across the diode 34 in the opposite polarity through Kirchhoff's voltage law in the closed circuit III.

Reference is made next to the closed circuits V, VI and VII. Usually the capacitors 47, 48, 49 and 51 are small in capacitance value and exhibit sufficiently high impedances over the high-frequency range including the switching frequency. Furthermore, the secondary winding portions 28a and 28b are usually formed as bifilar windings with their ends 32 and 45 held on the same side, by which the positions of the winding ends 32 and 45 become physically symmetrical with respect to the electrostatic shield layer 46. Therefore, the capacitance values of the capacitors 47 and 49 are nearly equal to each other and they are identified by $C_3$. Similarly, the positions of the winding ends 44 and 33 are also physically symmetrical with respect to the electrostatic shield layer 46. Therefore, the capacitance values of the capacitors 48 and 51 are substantially equal and they are identified by $C_4$.

Figure 10:
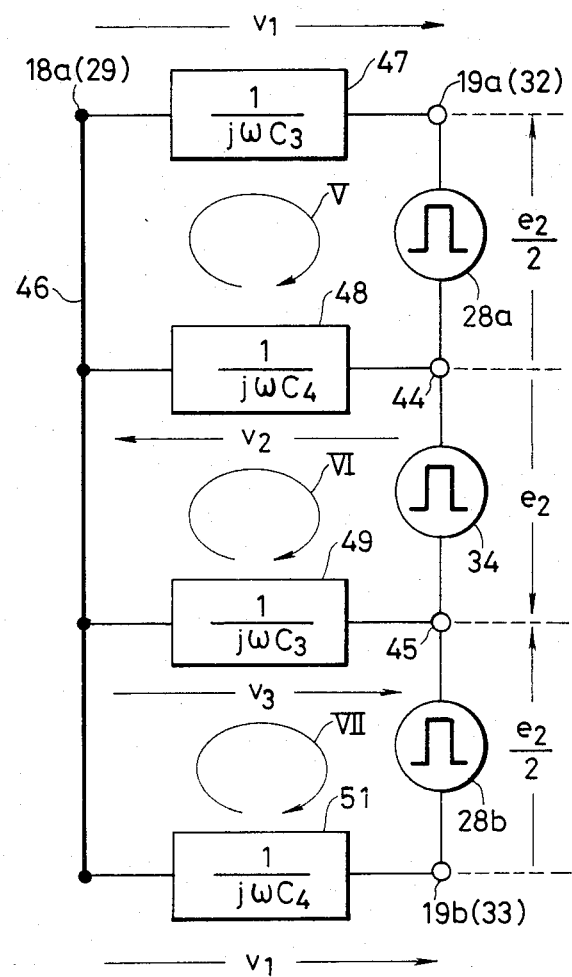
FIG. 10 is an enlarged diagram showing closed circuits V, VI, and VII in FIG. 9.

Reference is made next to the closed circuit VIII. Let it be assumed that the switching voltage $v_1$ is produced across the capacitor 47. Since the sum voltage across the secondary winding portions 28a and 28b and the voltage across the diode 34 are equal in amplitude but opposite in polarity to each other, a switching voltage equal in amplitude but opposite in polarity to the switching voltage $v_1$ developed across the capacitor 47 is induced across the capacitor 51 through Kirchhoff's voltage law. The switching voltage $v_1$ is the common mode switching voltage. This will be described with respect to FIG. 10. FIG. 10 shows the closed circuits V, VI and VII in FIG. 9 and the same reference numerals and characters as those in FIG. 9 are used. Let the capacitance values of the capacitors 47 and 49 and the capacitance values of the capacitors 48 and 51 be represented by $C_3$ and $C_4$, respectively. Solving equations in respect of the closed circuits V, VI and VII, respectively, it follows that $$v_1 = \frac{C_4 - C_3}{C_3 + C_4} \cdot \frac{e_2}{4} \qquad (2)$$

$$v_2 = \frac{3C_3 + C_4}{C_3 + C_4} \cdot \frac{e_2}{4} \qquad (3)$$

$$v_3 = \frac{C_3 + 3C_4}{C_3 + C_4} \cdot \frac{e_2}{4} \qquad (4)$$

Figure 8A:
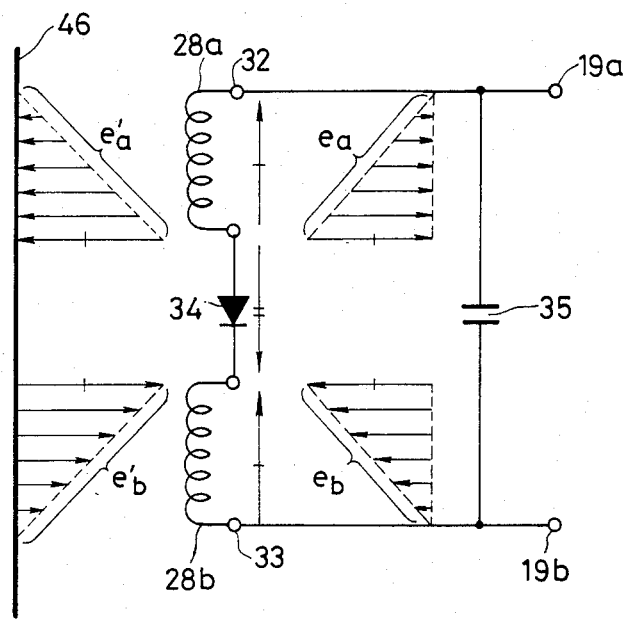
FIG. 8A is a diagram showing the AC voltage potential distribution induced in the secondary winding of the embodiment of FIG. 8.

From Eq. (2), the smaller the difference between the capacitance values $C_3$ of the capacitors 47 and 49 and the capacitance values $C_4$ of the capacitors 48 and 51, the more the common mode switching noise is reduced. It is relatively easy to make equal the stray capacitances between the electrostatic shield layer 46 and the winding end 32 (or 45) and between the electrostatic shield layer 46 and the winding end 44 (or 33) in FIG. 8. This can be achieved by making the positions of the winding ends 32 (or 45) and 44 (or 33) symmetrical with respect to the electrostatic shield layer 46. For example, it is sufficient that the secondary winding portions 28a and 28b are arranged to be in the same single-layer windings. That is, the technique of making the capacitance value $C_3$ of the capacitor 47 (or 49) and the capacitance value $C_4$ of the capacitor 48 (or 51) substantially equal in FIG. 10 is already known. It will be appreciated from the foregoing that the influence of the switching voltage $e_2/2$ induced across each of the secondary winding portions 28a and 28b on the voltage between the input and output terminals 18a and 19a can be lessened by connecting in series thereto the half-wave rectifying diode 34 at the center winding point of the secondary winding 28. FIG. 8A shows the potential distribution, where $e_a$ and $e_b$ represent potential distributions in the winding portions 28a, 28b with respect to either side of the capacitor 35, and $e_a'$ and $e_b'$ represent potential distribution in the winding portions 28a, 28b with respect to the electrostatic shield layer 46. The distribution $e_a$ and $e_a'$ as well as $e_b$ and $e_b'$ are symmetrical to each other.

As described in the foregoing, it is possible with the arrangement of FIG. 8 to provide a DC-DC converter in which the input terminals 18a and 18b and the output terminals 19a and 19b are isolated for DC current by a high impedance over the high-frequency range including the switching frequency and the generation of the common mode switching noise is suppressed.

Figure 11:
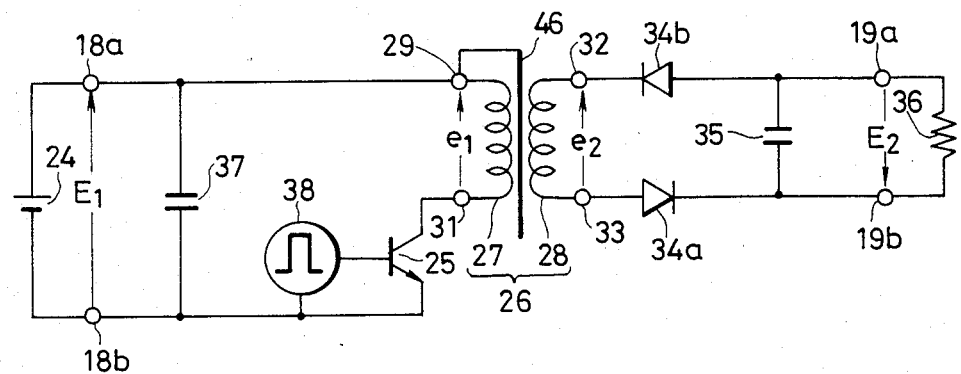
FIG. 11 is a connection diagram illustrating another embodiment of the present invention as being applied to the ON-OFF type DC-DC converter in which the balancing means is provided on the output side.

FIG. 11 illustrates a second embodiment of the present invention, in which half-wave rectifying elements, for example, diodes 34a and 34b are respectively connected in series with the opposite ends of the secondary winding 28. The other ends of the diodes 34a and 34b are connected to both ends of the output capacitor 35. Between the primary and secondary windings 27 and 28 is interposed the electrostatic shield layer 46, which is connected to the winding end 29 which is an AC-wise zero potential point (hereinafter referred to as the static end) of the primary winding 27. The input terminal 18b is also a static end because the impedance of the input capacitor 17 is substantially zero for the AC voltage. Therefore, even if the electrostatic shield layer 46 is connected to the input terminal 18b, the same effect can be obtained. The other reference numerals and characters are the same as those used in FIG. 3. On account of such a structure, this embodiment has the function of reducing the switching voltage which develops between the input and output terminals 18a and 18b, that is, the common mode switching noise as will be described hereinunder.

With the arrangement shown in FIG. 11, (i) owing to the provision of the electrostatic shield layer 46 between the primary and secondary windings 27 and 28 and owing to the connection of the electrostatic shield layer 46 to the winding end 29 which is the static end of the primary winding 27, the switching voltage $e_1$ which is generated across the primary winding 27 does not contribute to generate a voltage (the common mode switching noise) between the input and output terminals 18a and 19a. (ii) By the connection of the half-wave rectifying diodes 34a and 34b to the opposite ends of the secondary winding 28, a switching voltage generated between the one end 19a of the output capacitor 35 and a given point between the terminal 32 and the center winding point of the secondary winding 28 and a switching voltage generated between the other end 19b of the output capacitor 35 and a given point between the terminal 33 and the center winding point of the secondary winding 28 are made symmetrical with respect to the center winding point of the secondary winding 28, opposite in polarity and substantially equal in amplitude to each other. In this case, since the two ends 19a and 19b of the output capacitor 35 are respectively connected via the diodes 34a and 34b to the output ends 32 and 33 of the secondary winding 28, the switching voltage induced in the secondary winding 28 between it and the electrostatic shield layer 46 is confined only to the winding portions on the sides of the two ends 32 and 33 opposite from the center winding point of the secondary winding 28 and no switching voltage is developed at the center winding point. As a consequence, the switching voltage which is generated between the electrostatic shield layer 46 and the winding end 32 (or 33) and the switching voltage which is generated between the winding end 32 (or 33) and the output terminal 19a (or 19b) that are the two ends of the diode 34b (or 34a) become opposite in polarity, and hence they cancel each other, so that the switching voltage $e_2$ developed across the secondary winding 28 does not contribute to produce a voltage (the common mode switching noise) between the input and output terminals 18a and 19a.

Figure 12:
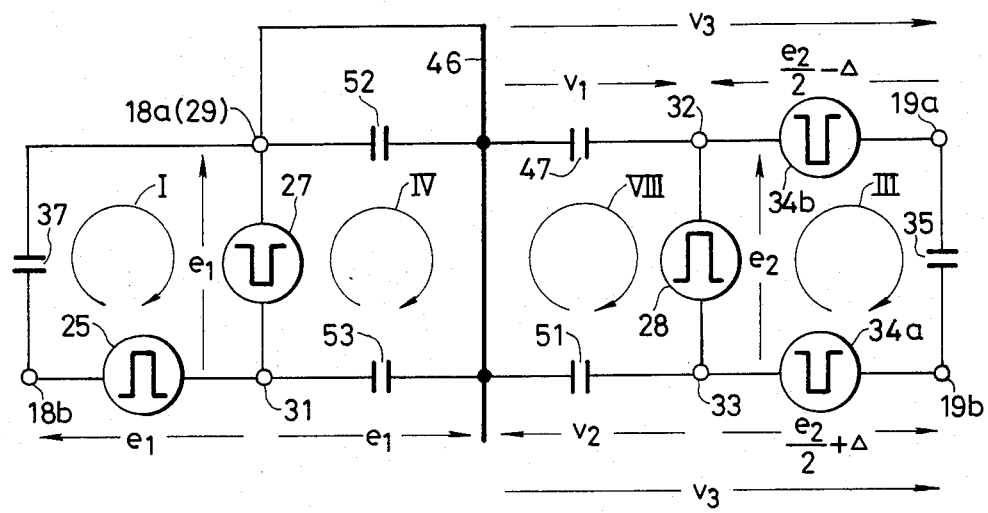
FIG. 12 is a diagram explanatory of the common mode switching noise reducing action in the DC-DC converter of FIG. 11.

This will be described in greater detail in respect of FIG. 12, which shows the common mode switching noise reducing action in the DC-DC converter of FIG. 11 in respect of the AC components of the noise. In FIG. 12 the reference numerals and characters are the same as those in FIG. 11, $e_1$, $e_2$, $v_1$ and $v_2$ each indicate a switching voltage between the respective terminals at a given time point and the arrows indicate the interrelation of the polarity of the respective voltages. Further, the parts corresponding to those in FIG. 9 are identified by the same reference numerals. The closed circuits I and IV are identical with those in FIG. 9; the closed circuit VIII is made up of the secondary winding 28, the capacitors 47 and 51 and the electrostatic shield layer 46; and the closed circuit III is formed by the secondary winding 28, the diodes 34a and 34b and the capacitor 34. A description will be given first of the matter mentioned above in (i). In FIG. 12, since the closed circuits I and IV are identical with those in FIG. 9, the switching voltage $e_1$ generated on the input side is confined thereto by the electrostatic shield layer 46 and does not exert influence upon the voltage between the input and output terminals 18a and 19a for the reasons given previously in connection with FIGS. 8 and 9.

Next, a description will be made of the matter mentioned in (ii) above. Reference is made first to the closed circuit III in FIG. 12. The output capacitor 35 acts as a short with respect to the switching frequency component, and hence does not produce a switching voltage thereacross. Across the secondary winding 28 is induced the switching voltage $e_2$. In this case, a switching voltage which is opposite in polarity to the switching voltage $e_2$ induced across the secondary winding 28 and whose amplitude is one-half that of the voltage $e_2$ is developed across each of the diodes 34a and 34b through Kirchhoff's voltage law in the closed circuit III. Here, the amplitudes of the switching voltages across the diodes 34a and 34b are set to $e_2/2 + \Delta$ and $e_2/2 - \Delta$, respectively, in view of dispersion in the diode characteristics.

Figure 13:
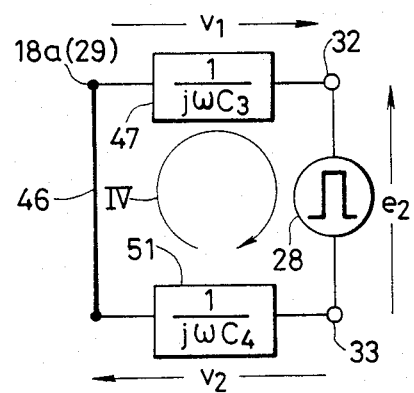
FIG. 13 is an enlarged diagram showing a closed circuit IV in FIG. 12.

Reference is made next to the closed circuit VIII. The capacitors 47 and 51 each indicate, in the form of a lumped parameter, an approximation of the stray capacitance distributed between the electrostatic shield layer 46 and the secondary winding 28. The capacitor 47 is connected between the electrostatic shield layer 46 and the winding end 32, whereas the capacitor 51 is connected between the electrostatic shield layer 46 and the winding end 33. Usually the capacitors 47 and 51 are both small in capacitance value and exhibit a sufficiently high impedance over the high-frequency range including the switching frequency. Letting the switching voltages developed across the capacitors 47 and 51 be represented by $v_1$ and $v_2$, respectively, they satisfy the relation $v_1 + v_2 = e_2$ through Kirchhoff's voltage law in the closed circuit VIII. This will be described with regard to FIG. 13 which shows the closed circuit VIII on an enlarged scale. In FIG. 13 the reference numerals and characters are the same as those in FIG. 12. The capacitance values of the capacitors 47 and 51 are identified by $C_3$ and $C_4$, respectively. Solving the equation in connection with the closed circuit VIII of FIG. 13, it follows that $$v_1 = \frac{C_4}{C_3 + C_4} e_2 \tag{5}$$

Turning back to FIG. 12, the common mode switching voltage is a switching voltage which is developed between the input and output terminals 18a and 19a. Letting this voltage be represented by $v_3$, it follows from FIG. 12 that $$v_3 = v_1 - \left(\frac{e_2}{2} - \Delta\right) \tag{6}$$

Substituting Eq. (5) into Eq. (6), it follows that $$v_3 = \frac{C_4 - C_3}{C_3 + C_4} \cdot \frac{e_2}{2} + \Delta \tag{7}$$

Figure 11A:
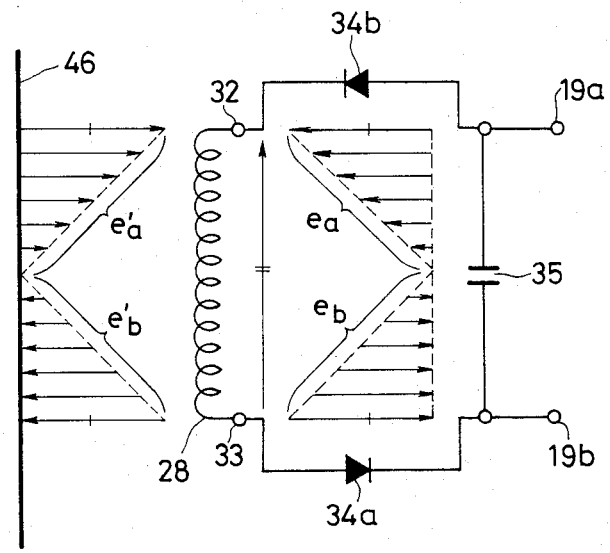
FIG. 11A is a diagram showing the potential distribution induced in the secondary winding of the embodiment of FIG. 11.

In Eq. (7), the value of $\Delta$ is sufficiently small and the smaller the difference between the capacitance values $C_3$ and $C_4$ of the capacitors 47 and 51 becomes, the more the common mode switching noise is reduced. It is relatively easy to make equal the stray capacitances between the electrostatic shield layer 46 and the winding end 32 and between the electrostatic shield layer 46 and the winding end 33. This can be achieved by making the physical positions of the winding ends 32 and 33 symmetrical with respect to the electrostatic shield layer 46. For instance, it is sufficient to arrange the secondary winding 28 to be a single-layer winding. That is, the technique of making the capacitance values $C_3$ and $C_4$ of the capacitors 47 and 51 substantially equal in FIG. 13 is already known. It will be appreciated from the above that the influence of the switching voltage $e_2$ induced across the secondary winding 28 upon the voltage between the input and output terminals 18a and 19a can be lessened by connecting the half-wave rectifying diodes 34a and 34b to the opposite ends of the secondary winding 28. FIG. 11A shows the potential distributions $e_a$, $e_b$ produced in the secondary winding 28 with respect to either the terminals 19a and 19b and $e_a'$, $e_b'$ with respect to the electrostatic shield 46.

With the arrangement shown in FIG. 11, it is possible to realize a DC-DC converter the input and output sides of which are isolated DC-wise by a high impedance over the high-frequency range including the switching frequency and which suppresses the generation of the common mode switching noise.

In the case of forming a multi-output DC-DC converter having a plurality of secondary windings in FIGS. 8 and 11, it is advantageous for preventing the generation of the common mode switching noise to employ an arrangement in which the primary winding and the secondary windings are wound layer by layer on the same axial position of the core and an electrostatic shield layer is also interposed between the layers of the adjacent secondary windings and is connected to the electrostatic shield layer 46 sandwiched between the primary winding and the secondary winding immediately adjacent thereto.

Figure 14:
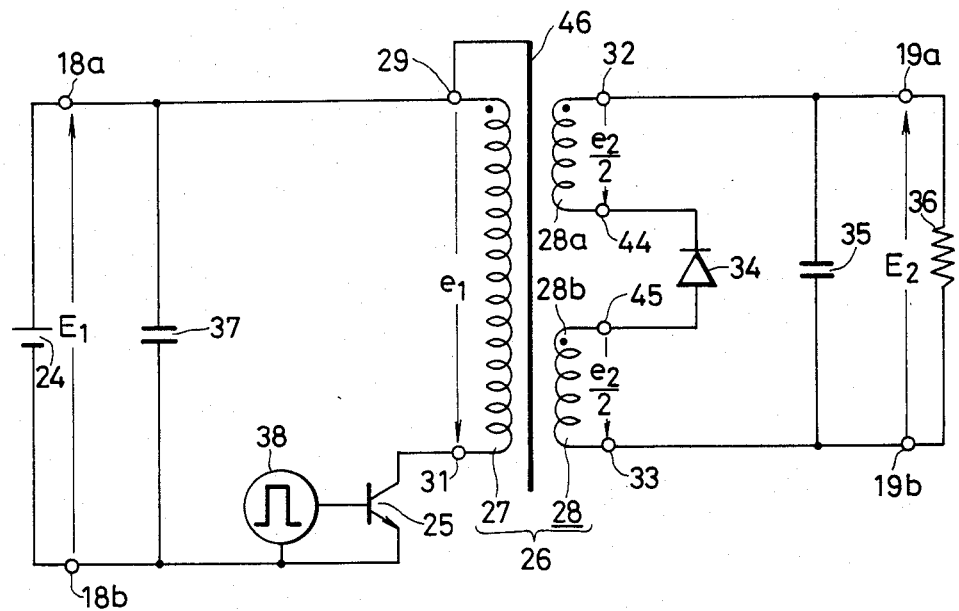
FIG. 14 is a connection diagram illustrating another embodiment of the present invention as being applied to an ON-ON type DC-DC converter in which the balancing means is provided on output side.
Figure 15:
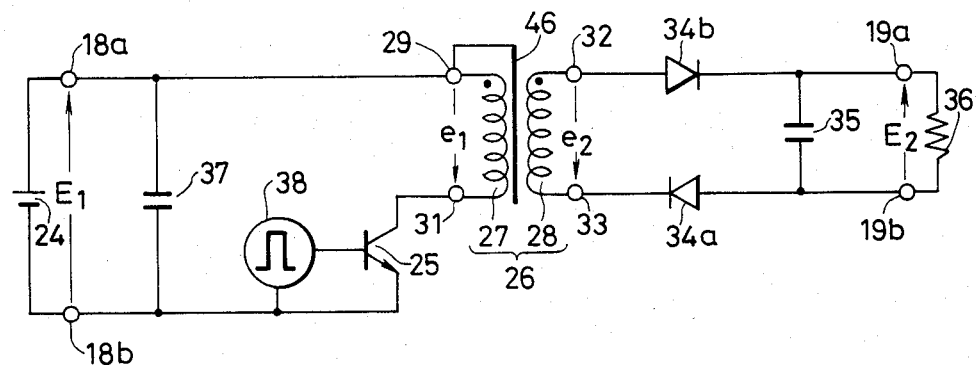
FIG. 15 is a connection diagram illustrating another embodiment of the present invention as being applied to the ON-ON type DC-DC, converter in which the balancing means is provided on the output side.

While in the foregoing the present invention has been described in FIGS. 8 and 11 as being applied to what is called an ON-OFF type DC-DC converter in which, when the switching element 25 on the side of the primary winding of the transformer is in the OFF state the half-wave rectifying diodes 34, 34a and 34b on the side of the secondary winding conduct, the invention is also applicable to what is called an ON-ON type DC-DC converter in which the half-wave rectifying diode on the secondary side conducts when the switching element on the primary side is in the ON state. FIGS. 14 and 15 illustrate the ON-ON type DC-DC converters of the present invention which correspond to the circuit arrangements of FIGS. 8 and 11, respectively. The embodiments of FIGS. 14 and 15 are identical with those of FIGS. 8 and 11 except that the rectifying diodes 34, 34a and 34b are reverse in polarity from those in the latter.

Figure 16:
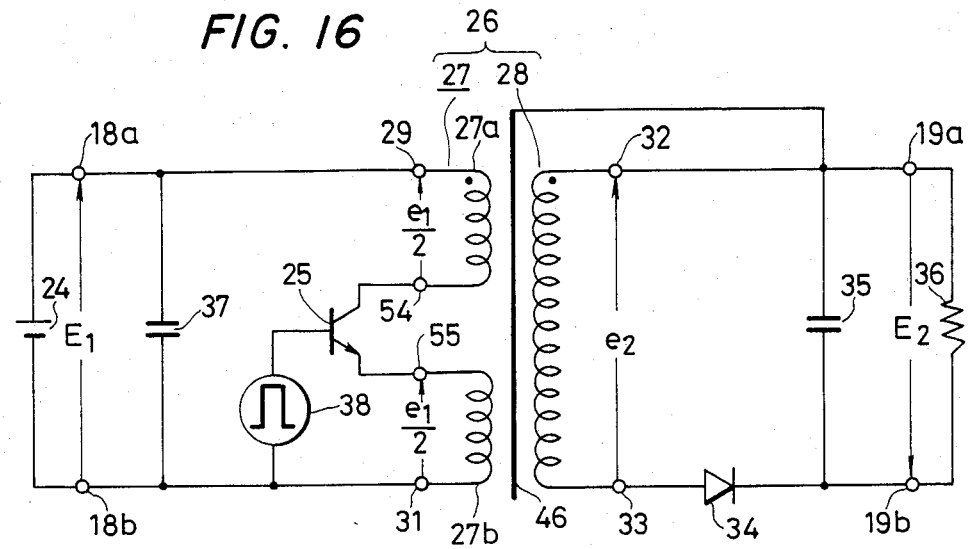
FIG. 16 is a connection diagram illustrating another embodiment of the present invention as being applied to the ON-OFF type DC-DC converter in which the balancing means is provided on the input side.

FIG. 16 illustrates a fifth embodiment of the present invention, in which the parts corresponding to those in FIG. 3 are identified by the same reference numerals. In this embodiment the center winding point of the primary winding 27 is opened and the switching element 25 is connected between open ends 54 and 55 of the primary winding 27, constituting the balancing means. Accordingly, the primary winding 27 is divided into winding portions 27a and 27b. Between the primary and secondary windings 27 and 28 is interposed the electrostatic shield layer 46, which is connected to the side of the output capacitor 35, that is, to the output terminal 19a which is an AC-wise zero potential point (hereinafter referred to as the static end) of the secondary winding 28. The output terminal 19b is also a static end and even if the electrostatic shield layer 46 is connected to the output terminal 19b, the same effect is produced. Such an arrangement reduces the switching voltage which is developed between the input and output terminals 18a and 19a, that is, the common mode switching noise, as will be described hereunder.

In the case of the conventional DC-DC converter of FIG. 3, the common mode switching noise is generated by the influence of both the switching voltage $e_1$ induced across the primary winding 27 and the switching voltage $e_2$ induced across the secondary winding 28 as will be seen from Eq. (1). In the embodiment of FIG. 16, however, (i) the switching voltage $e_2$ across the secondary winding 28 does not cause to produce a voltage (the common mode switching noise) between the input and output terminals 18a and 19a because the electrostatic shield layer 46 is interposed between the primary and secondary windings 27 and 28 and is connected to the output terminal 19a which is the static end of the secondary winding 28. (ii) Furthermore, a switching voltage which is generated between the one end 18a of the input capacitor 37 and a given point on the primary winding portion 27a and a switching voltage which is produced between the other end 18b of the input capacitor 37 and a given point on the primary winding portion 27b become symmetrical with respect to the center taps 54 and 55, opposite in polarity but substantially equal in amplitude to each other because of the connection of the switching element 25 to the center taps of the primary winding 27. In this case, since the two ends 18a and 18b of the input capacitor 37 and the output ends 29 and 31 of the primary winding 27 are respectively the common potential points and since the switching element 25 is connected between the center taps 54 and 55 of the primary winding 27, the switching voltages induced between the primary winding 27 and the electrostatic shield layer 46 are generated only on the sides of the center taps 54 and 55 as viewed from the output ends 29 and 31 of the primary winding 27 and no switching voltages are developed between the ends 29 and 31 of the primary winding 27 and the electrostatic shield layer 46. Therefore, the switching voltage $e_1/2$ induced across each of the primary winding portions 27a and 27b does not cause to produce a voltage (the common mode switching voltage) between the input and output terminals 18a and 19a. This will be described in greater detail with reference to FIG. 17.

Figure 17:
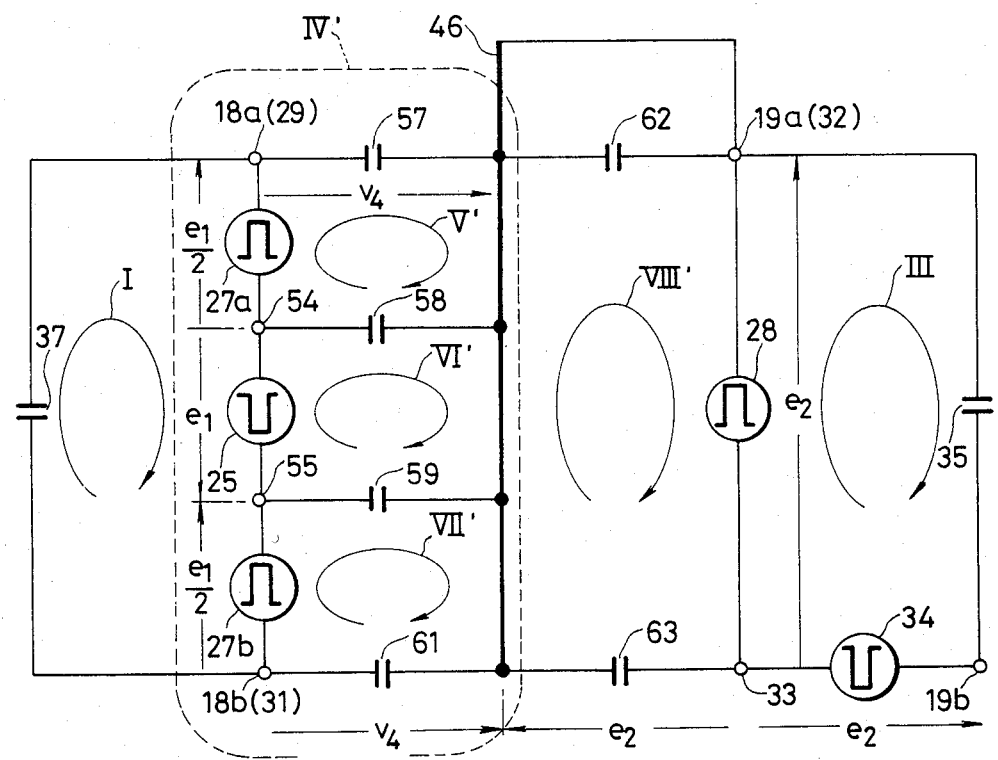
FIG. 17 is a diagram explanatory of the common mode switching noise reducing action in the DC-DC converter of FIG. 16.

FIG. 17 shows the common mode switching noise reducing action in the DC-DC converter of FIG. 16, noting the AC components of the noise. In FIG. 17 the same reference numerals as those in FIG. 16 are used to indicate like parts, $e_1$, $e_2$ and $v_4$ each indicate a switching voltage between respective terminals at a given time point and the arrows indicate the interrelation of the polarities of the respective voltages. Capacitors 57 and 58 each indicate, in the form of a lumped parameter, an approximation of the stray capacitance distributed between the primary winding portion 27a and the electrostatic shield layer 46, the capacitors 57 and 58 being connected between the two ends 29 and 54 of the primary winding portion 27a and the electrostatic shield layer 46, respectively. Capacitors 59 and 61 each indicate, in the form of a lumped parameter, an approximation of the stray capacitance distributed between the primary winding portion 27b and the electrostatic shield layer 46, the capacitors 59 and 61 being connected between the two ends 55 and 31 of the primary winding portion 27b and the electrostatic shield layer 46, respectively. Likewise, capacitors 62 and 63 each indicate, in the form of a lumped parameter, an approximation of the stray capacitance distributed between the secondary winding 28 and the electrostatic shield layer 46, the capacitors 62 and 63 being connected between the ends 32 and 33 of the secondary winding 28 and the electrostatic shield layer 46, respectively. A closed circuit including the capacitor 37, the primary winding portions 27a and 27b and the switching element 25, a closed circuit including the primary winding portions 27a and 27b, the switching element 25 and the electrostatic shield layer 46, a closed circuit including the primary winding portion 27a, the electrostatic shield layer 46 and the capacitors 57 and 58, a closed circuit including the switching element 25, the electrostatic shield layer 46 and the capacitors 58 and 59, a closed circuit including the primary winding portion 27b, the electrostatic shield layer 46 and the capacitors 59 and 61 and a closed circuit including the secondary winding 28, the capacitors 62 and 63 and the electrostatic shield layer 46 will hereinafter be referred to as closed circuits I, IV', V', VI', VII' and VIII', respectively.

A description will be given first of the matter mentioned above in (i). Referring first to the closed circuit III, the output capacitor 35 appears as a short (a sufficiently low impedance) with respect to the switching frequency component, and hence does not induce thereacross a switching voltage. Accordingly, a switching voltage which is equal in amplitude but opposite in polarity to the switching voltage $e_2$ induced across the secondary winding 28 is developed across the half-wave rectifying diode 34 through Kirchhoff's voltage law. In the closed circuit VIII', since the two ends of the capacitor 62 are short-circuited by the electrostatic shield layer 46, no switching voltage is generated across the capacitor 62. Consequently, there is produced, through Kirchhoff's voltage law in the closed circuit VIII', across the capacitor 63 a switching voltage which is equal in amplitude but opposite in polarity to the switching voltage $e_2$ induced across the secondary winding 28. It will be seen from the above that the switching voltage developed on the output side is confined by the electrostatic shield layer 46 to the output side alone, exerting no influence on the voltage between the input and output terminals 18a and 19a.

Next, a description will be given of the matter mentioned above in (ii). Reference is made first to the closed circuit I. The input capacitor 37 acts as a short with respect to the switching frequency component, and hence does not produce thereacross a switching voltage. Since the primary winding 27 is divided into two at the center winding point, switching voltages $e_1/2$ of the same amplitude are induced across the primary winding portions 27a and 27b in the same polarity. In this case, a switching voltage which is equal in amplitude to the sum $e_1$ of the voltages $e_1/2$ induced across the primary winding portions 27a and 27b is developed across the switching element 25 in the polarity reverse from those of the voltages $e_1/2$ through Kirchhoff's voltage law in closed circuit I.

Referring next to the closed circuits V', VI' and VII', the capacitors 57, 58, 59 and 61 are usually small in capacitance value and exhibit sufficiently high impedances over the high-frequency range including the switching frequency. Moreover, the primary winding portions 27a and 27b are usually formed as bifilar windings with their ends 29 and 55 held at the same side, by which the winding ends 29 and 55 assume positions physically symmetrical with respect to the electrostatic shield layer 46. In consequence, the capacitors 57 and 59 have a nearly equal capacitance value, which is identified by $C_5$. Similarly, the positions of the winding ends 54 and 31 are also physically symmetrical with respect to the electrostatic shield layer 46, so that the capacitors 58 and 61 have substantially the same capacitance value, which is represented by $C_6$.

Figure 18:
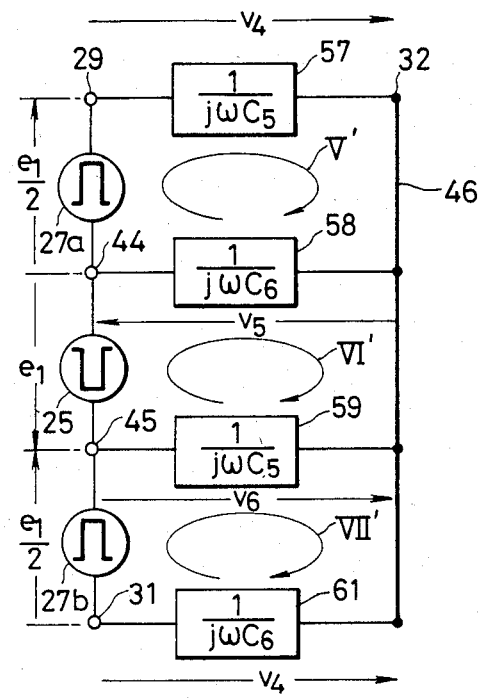
FIG. 18 is an enlarged diagram showing closed circuits V', VI' and VII' in FIG. 17.

Turning next to the closed circuit IV', let it be assumed that a switching voltage $v_4$ is produced across the capacitor 57. Since the sum of the voltages across the primary winding portions 27a and 27b and the voltage across the switching element 25 are equal but opposite in polarity as referred to previously, a switching voltage which is equal in amplitude but opposite in polarity to the switching voltage $v_4$ across the capacitor 57 is developed across the capacitor 61 through Kirchhoff's voltage law. The switching voltage $v_4$ is the common mode switching voltage. Next, a description will be given of FIG. 18, which shows the closed circuits V', VI' and VII' in FIG. 17 and in which the parts corresponding to those in FIG. 17 are identified by the same reference numerals. The capacitance values of the capacitors 57 and 59 are indicated by $C_5$ and the capacitance values of the capacitors 58 and 61 are indicated by $C_6$. Solving equations in connection with the closed circuits V', VI' and VII' of FIG. 18, it follows that $$v_4 = \frac{C_5 - C_6}{C_5 + C_6} \cdot \frac{e_1}{4} \qquad (8)$$

$$v_3 = \frac{3C_6 + C_5}{C_5 + C_6} \cdot \frac{e_1}{4} \qquad (9)$$

$$v_4 = \frac{C_6 + 3C_5}{C_5 + C_6} \cdot \frac{e_1}{4} \qquad (10)$$

From Eq. (8), the smaller the difference between the capacitance values $C_5$ and $C_6$ of the capacitors 57 and 59 and the capacitors 58 and 61 is, the more the common mode switching noise is reduced. In FIG. 16, the stray capacitances distributed between the electrostatic shield layer 46 and the winding end 29 (or 55) and between the electrostatic shield layer 46 and the winding end 54 (or 31) can be made equal relatively easily; this can be achieved by making the physical positions of the winding ends 29 (or 55) and 54 (or 31) relative to the electrostatic shield layer 46 symmetrical with respect thereto, for example, by forming the primary winding portions 27a and 27b as single-layer windings. That is to say, the technique of making the capacitance values $C_5$ and $C_6$ of the capacitors 57 (or 59) and 58 (or 61) almost equal to each other is already known. From the above it will be appreciated that the influence of the switching voltage $e_1/2$ induced across each of the primary winding portions 27a and 27b upon the voltage generated between the input and output terminals 18a and 19a can be lessened by connecting the switching element 25 in series with the primary winding 27 at the center winding point thereof.

With the circuit arrangement shown in FIG. 16, it is possible to provide a DC-DC converter in which the input and output terminals 18a, 18b and 19a, 19b are isolated by a high impedance over the high-frequency range including DC and the switching frequency and the generation of the common mode switching noise is suppressed.

Figure 19:
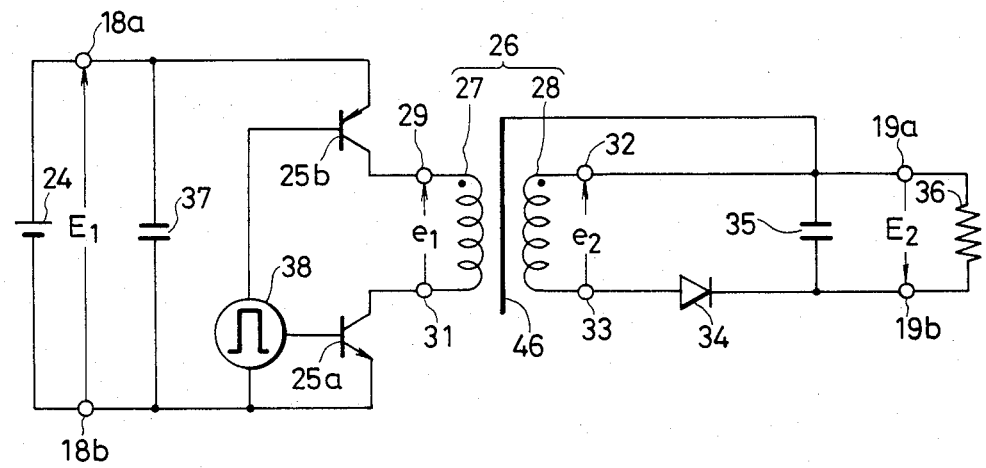
FIG. 19 is a connection diagram illustrating another embodiment of the present invention as being applied to the ON-OFF type DC-DC converter in which the balancing means is provided on the input side.

FIG. 19 illustrates a sixth embodiment of the present invention, in which switching elements 25a and 25b are connected in series to the respective winding ends of the primary winding 27 and are controlled by the drive circuit 38 to be turned ON and OFF at the same timing. The other ends of the switching elements 25a and 25b are connected to the respective ends of the input capacitor 37. Between the primary and secondary windings 27 and 28 is interposed the electrostatic shield layer 46, which is connected to the winding end 32 which is the static end of the secondary winding 28. The output terminal 19b is also a static end and, therefore, even if the electrostatic shield layer 46 is connected to the output terminal 19b, the same effect is obtained. The other reference numerals and characters are the same as those in FIG. 3. Such an arrangement as mentioned above produces the effect of reducing the switching voltage which is developed between the input and output terminals 18a and 19a, that is, the common mode switching noise.

According to the circuit structure shown in FIG. 19, (i) the switching voltage $e_2$ which is induced across the second winding 28 is not generated as a voltage (the common mode switching noise) between the input and output terminals 18a and 19a because the electrostatic shield layer 46 is interposed between the primary and secondary windings 27 and 28 and is connected to the winding end 32 which is the static end of the secondary winding 28. (ii) By the connection of the switching elements 25a and 25b to the respective ends of the primary winding 27 and their ON-OFF control at the same timing, a switching voltage which is produced between the one end 18a of the input capacitor 37 and a given point between the terminal 29 and the center winding point of the primary winding 27 and a switching voltage which is yielded between the other end of the input capacitor 37 and a given point between the terminal 31 and the center winding point of the primary winding 27 are made opposite in polarity and substantially equal in amplitude to each other. In this case, since the ends 18a and 18b of the input capacitor 37 are connected via the switching elements 25a and 25b to the output ends 29 and 31 of the primary winding 27, respectively, the switching voltage which is induced in the primary winding 27 between it and the electrostatic shield layer 46 is developed on the side of each of the output ends 29 and 31 and is not produced at the center winding point. As a consequence, switching voltages yielded between the electrostatic shield 46 and the winding end 29 (or 31) and between the winding end 29 (or 31) and the input terminal 18a (or 18b) which are the two ends of the switching element 25a (or 25b) become opposite in polarity and cancel each other, so that the switching voltage $e_1$ produced across the primary winding 27 is not developed as a voltage (the common switching noise) between the input and output terminals 18a and 19a.

Figure 20:
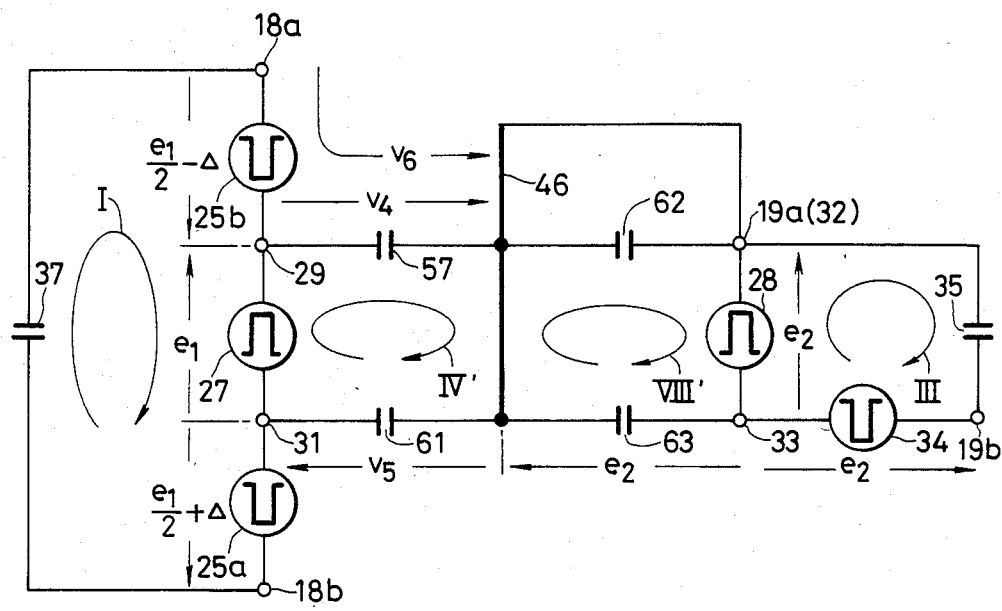
FIG. 20 is a diagram explanatory of the common mode switching noise reducing action in the DC-DC converter of FIG. 19.

This will be described in more detail with reference to FIG. 20, which shows the common mode switching noise reducing action in the DC-DC converter of FIG. 19 in respect of the AC components of the noise. In FIG. 20 the same characters as those in FIG. 19 are used, $e_1$, $e_2$, $v_4$ and $v_5$ each indicate a switching voltage between terminals at a given time point and the arrows show the interrelation of the polarities of the voltages. The parts corresponding to those in FIG. 17 are identified by the same reference numerals and the closed circuits III and VIII' are identical with those in FIG. 17. The closed circuit I is formed by the capacitor 37, the primary winding 27 and the switching elements 25a and 25b, and the closed circuit IV' is formed by the primary winding 27, the capacitors 57 and 61 and the electrostatic shield layer 46.

A description will be given first of the matter mentioned previously in (i). In FIG. 20, since the closed circuits III and VIII' are identical with those designated III and VIII' in FIG. 17, the switching voltage $e_2$ generated on the output side is confined thereto by the electrostatic shield layer 46, exerting no influence on the voltage between the input and output terminals 18a and 18b as is the case with FIG. 17.

Next, a description will be given of the matter mentioned previously in (ii). Referring first to the closed circuit I, the input capacitor 37 acts as a short with respect to the switching frequency component, and hence does not induce thereacross any switching voltage. Across the primary winding 27 is induced the switching voltage $e_1$. The switching elements 25a and 25b are turned ON and OFF in in-phase relation. Accordingly, a switching voltage which is opposite in polarity to the switching voltage $e_1$ induced across the primary winding 27 and the amplitude of which is one-half of the amplitude of the voltage $e_1$ is developed across each of the switching elements 25a and 25b through Kirchhoff's voltage law in the closed circuit I. Here, taking into account dispersion in the characteristic of the switching elements, the amplitudes of the switching voltages across the switching elements 25a and 25b are represented by $e_1/2+\Delta$ and $e_1/2-\Delta$, respectively.

Turning next to the closed circuit IV', the capacitors 57 and 61 each indicate, in the form of a lumped parameter, an approximation of the stray capacitance distributed between the electrostatic shield layer 46 and the primary winding 27. The capacitor 57 is connected between the electrostatic shield layer 46 and the winding end 29, and the capacitor 61 is connected between the electrostatic shield layer 46 and the winding end 31. Usually the capacitors 57 and 61 are both small in capacitance value and exhibit sufficiently high impedances over the high-frequency range including the switching frequency. Now, letting the switching voltages induced across the capacitors 57 and 61 be represented by $v_4$ and $v_5$, respectively, they bear a relation, $v_4+v_5=-e_1$ through Kirchhoff's voltage law in the closed circuit IV'.

Figure 21:
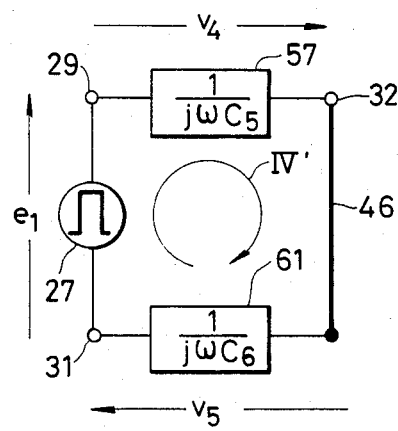
FIG. 21 is an enlarged diagram showing a closed circuit VIII' in FIG. 20.

This will be described in respect of FIG. 21 which is an enlarged showing of the closed circuit IV'. In FIG. 21, the same reference characters as those in FIG. 20 are used and the capacitance values of the capacitors 57 and 61 are represented by $C_5$ and $C_6$, respectively. Solving an equation in connection with the closed circuit IV' of FIG. 21, it follows that $$v_4 = \frac{-C_6}{C_5 + C_6} \cdot e_1 \quad (11)$$

Turning back to FIG. 20, the common mode switching voltage is the switching voltage which is generated between the input and output terminals 18a and 19a and, letting this voltage be represented by $v_6$, it follows from FIG. 20 that $$v_6 = v_4 + \left(\frac{e_1}{2} - \Delta\right) \quad (12)$$

Substituting Eq. (11) into Eq. (12), $$v_6 = \frac{C_5 - C_6}{C_5 + C_6} \cdot \frac{e_1}{2} - \Delta \quad (13)$$

In Eq. (13) the value of $\Delta$ is sufficiently small, and the smaller the difference between the capacitance values $C_5$ and $C_6$ of the capacitors 57 and 61 is, the more the common mode switching noise is reduced. It is relatively easy to make the stray capacitances between the electrostatic shield layer 46 and the winding end 29 and between the electrostatic shield layer 46 and the winding end 31 equal in FIG. 19. This can be achieved by making the physical positions of the winding ends 29 and 31 symmetrical with respect to the electrostatic shield layer 46; for example, it is sufficient to form the primary winding 27 as a single-layer winding. That is to say, the technique of making the capacitance values $C_5$ and $C_6$ of the capacitors 57 and 61 in FIG. 20 substantially equal to each other is already known. It will be appreciated from the above that the influence of the switching voltage $e_1$ induced across the primary winding 27 upon the voltage between the input and output terminals 18a and 19a can be lessened by connecting the switching elements 25a and 25b to the respective ends of the primary winding 27.

With the arrangement shown in FIG. 19, it is possible to provide a DC-DC converter which permits DC-wise isolation of its input and output sides by a high impedance over the high frequency range including the switching frequency and suppresses the generation of the common mode switching noise.

In the case of providing a multi-output DC-DC converter having a plurality of secondary windings through using the structures of FIGS. 16 and 19, it is advantageous for suppressing the generation of the common mode switching noise to employ an arrangement in which the primary winding and the plurality of secondary windings are wound layer by layer on the same axial position of the core and an electrostatic shield layer is also interposed between the layers of the adjacent secondary windings and is connected to the electrostatic shield layer sandwiched between the primary winding and the secondary winding immediately adjacent thereto.

Figure 22:
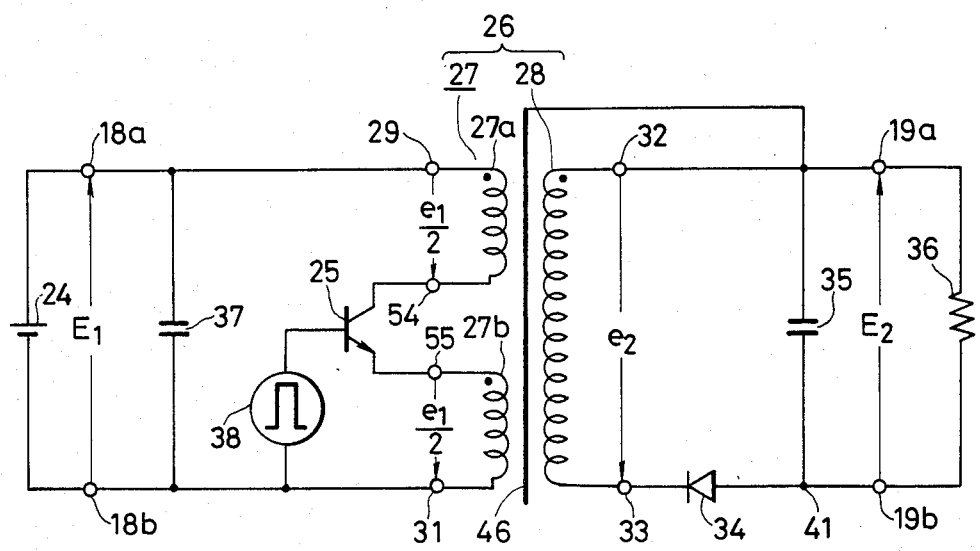
FIG. 22 is a connection diagram illustrating another embodiment of the present invention as being applied to the ON-ON type DC-DC converter in which the balancing means is provided on the input side.
Figure 23:
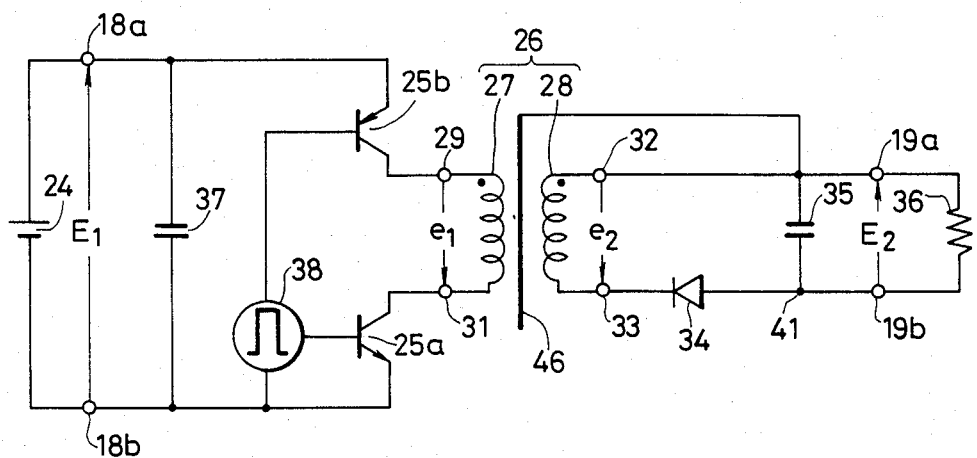
FIG. 23 is a connection diagram illustrating another embodiment of the present invention as being applied to the ON-ON type DC-DC converter in which the balancing means is provided on the input side.

Although in FIGS. 16 and 19 the present invention has been described as being applied to what is called an ON-OFF type DC-DC converter, in which the half-wave rectifying diode 34 on the output side is conductive when the switching elements 25, 25a and 25b on the input side are in the OFF state, the methods employed in FIGS. 16 and 19 are also applicable to what is called ON-ON type DC-DC converter in which the half-wave rectifying diode on the output side conducts when the switching elements on the input side are in the ON state. FIG. 22 shows an example of this latter arrangement corresponding to FIG. 16. The difference between these circuit arrangements is that the polarity of the half-wave rectifying diode 34 in FIG. 22 is reverse from that in the case of FIG. 16. FIG. 23 illustrates the ON-ON type DC-DC converter corresponding to the converter of FIG. 19 and, in this case, too, the former differs from the latter only in the polarity of the half-wave rectifying diode 34.

Figure 24:
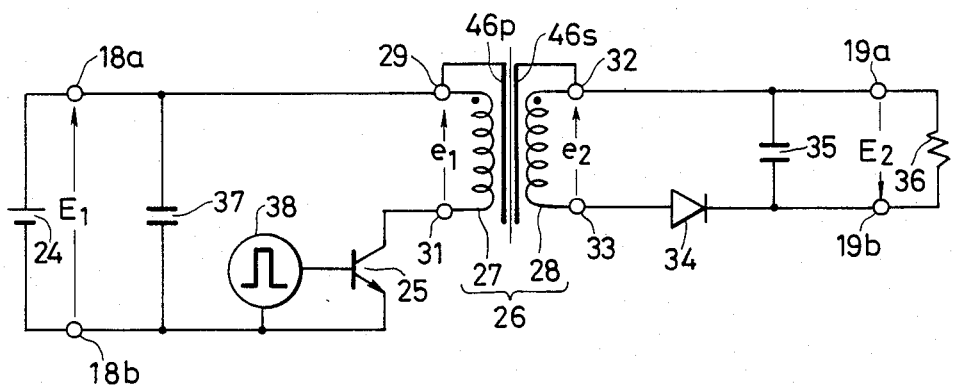
FIG. 24 is a connection diagram illustrating another embodiment of the present invention as being applied to the ON-OFF type DC-DC converter which employs two electrostatic shield layers.
Figure 25:
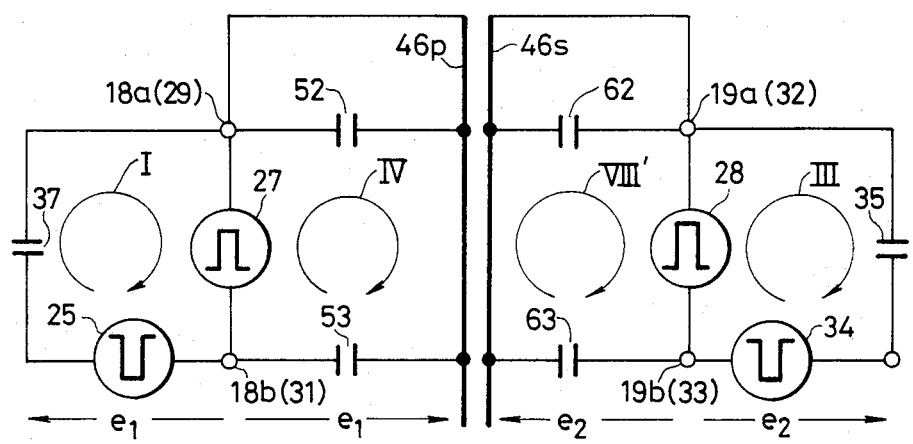
FIG. 25 is a diagram explanatory of the common mode switching noise reducing action in the DC-DC converter of FIG. 24.

FIG. 24 illustrates a ninth embodiment of the present invention. In this embodiment an electrostatic shield layer 46p is interposed between the primary and secondary windings 27 and 28 and is connected to the static end of the primary winding 27, for instance, the winding end 29. Furthermore, another electrostatic shield layer 46s is interposed between the electrostatic shield layer 46p and the secondary winding 28 and is connected to the static end of the secondary winding 28, for example, the winding end 32. The electrostatic shield layers 46p and 46s are electrically separated from each other by an insulating film. Reference numerals and characters used in FIG. 24 are the same as those in FIG. 3. FIG. 25 shows an equivalent circuit of the DC-DC converter in terms of AC components in noise. In FIG. 25 the input side on the side of the electrostatic shield layer 46p is identical with the input side on the side of the electrostatic shield layer 46 in FIG. 9, so that the switching voltage $e_1$ generated on the input side is confined thereto by the electrostatic shield layer 46p, exerting no influence on the voltage between the input and output terminals 18a and 19a. Similarly, the output side on the side of the electrostatic shield layer 46s is identical with the output side on the side of the electrostatic shield layer 46 in FIG. 17, so that the switching voltage $e_2$ generated on the output side is confined thereto by the electrostatic shield 46s, exerting no influence on the voltage between the input and output terminals 18a and 19a. In other words, the DC-DC converter of FIG. 24 is free from the generation of the switching voltage between the input and output terminals 18a and 19a. It is evident that the method of providing the two electrostatic shield layers 46p and 46s is also applicable to the ON-ON type DC-DC converter.

As has been described in the foregoing, according to the present invention, the input and output side of the DC-DC converter can be isolated by a high impedance over a high-frequency range including DC and the switching frequency and the generation of the common mode switching noise can be suppressed. Accordingly, the DC-DC converter of the present invention is suitable for use, for example, as the power receiving source 17 for the digital line terminating equipment which is installed in the subscriber's premises and activated by remote power feeding from the central office and as the power feeding source 5 of the central office in the digital subscriber line transmission system using the balanced type cable, described previously in respect of FIG. 1. In concrete terms, the present invention prevents the switching noise developed by the DC-DC converter from being induced in the pulse transmission system, permitting the digital line terminating equipment and the subscriber's line to be isolated by a high impedance. This ensures to a high common mode rejection ratio of the digital line terminating equipment in the pulse transmission band, minimizing the occurrence of a code error of the digital signal with respect to large common mode noise that is induced on the subscriber's line.

Next, a description will be given of experimental results of the present invention. In the DC-DC converters of the arrangements of FIGS. 8 and 14 in which the input voltage $E_1$ was about 26 V, the input current was a constant current about 24 mA, the output voltage $E_2$ was 5 V±3.5%, the output power was approximately 500 mW, the number of turns of the primary winding 27 was 80 or so, the secondary windings 28a and 28b were bifilar windings with about eight turns, the electrostatic shield layer 46 was a copper foil, the switching element 25 was a MOS-FET, the rectifying diode 34 was a Schottky barrier diode, the secondary windings 28a and 28b were single-layer and the switching frequency was about 70 KHz, the common mode switching noise was approximately 0.5 Vpp in terms of ripple components and the power conversion efficiency was around 80%. This indicates that the present invention is excellent as compared with the prior art example of FIG. 3 in which the common mode switching noise was about 10 Vpp although the experimental conditions were somewhat different from those mentioned above. The value of the common mode switching noise did not change regardless of whether the switching element driving circuit 38 was self-excited or separately-excited. The output power was made constant-voltage through using a shunt regulator on the output side.

Furthermore, similar results were also obtained with the circuit arrangements of FIGS. 11 and 15 in which the secondary winding 28 was a single-layer winding with about 16 turns, the half-wave rectifying diodes 34a and 34b were Schottky barrier diodes and the other conditions were the same as mentioned above.

It will be apparent that many modifications and variations may be effected without departing from the scope of the novel concepts of the present invention.

What is claimed is:

1. A DC-DC converter for remote power feeding which is connected via a power separating filter to a signal line on which an AC signal is superimposed on DC power, comprising:

an input capacitor connected to said power separating filter and supplied with the DC power separated by said power separating filter;

a transformer whose input and output sides float off ground, said transformer including a primary winding coupled to a pair of input terminals, a secondary winding having its opposing ends coupled to a pair of output terminals respectively, and an electrostatic shield interposed between said primary and secondary windings, one of said input terminals of said primary winding being connected to one side of said input capacitor, and said secondary winding being opened at its center winding point to provide two center terminals;

switching means connected between the other input terminal of said primary winding and the other side of said input capacitor, for supplying electric energy stored in said input capacitor to said primary winding through a switching operation; and voltage balancing means operative to cause the AC voltage induced in a one half winding portion of one of said windings, relative to a center point on said one of said windings, to be substantially equal in potential and substantially opposite in polarity to the AC voltage induced in the other half winding portion of said one of said windings thereby to suppress common mode noise resulting from operation of said switching means, said voltage balancing means including rectifying means connected between said two center terminals of said secondary winding, and an output capacitor connected between said output terminals of said secondary winding;

said electrostatic shield being connected to a zero potential point in the primary side circuit which includes said primary winding, said switching means and said input capacitor.

2. A DC-DC converter for remote power feeding which is connected via a power separating filter to a signal line on which an AC signal is superimposed on DC power, comprising:

an input capacitor connected to said power separating filter and supplied with the DC power separated by said power separating filter;

a transformer whose input and output sides float off ground, said transformer including a primary winding coupled to a pair of input terminals, a secondary winding having its opposing ends coupled to a pair of output terminals respectively, and an electrostatic shield interposed between said primary and secondary windings, one of said input terminals of said primary winding being connected to one side of said input capacitor;

switching means connected between the other input terminal of said primary winding and the other side of said input capacitor for supplying electric energy stored in said input capacitor to said primary winding through a switching operation; and voltage balancing means operative to cause the AC voltage induced in a one half winding portion of one of said windings, relative to a center point on said one of said windings, to be substantially equal in potential and substantially opposite in polarity to the AC voltage induced in the other half winding portion of said one of said windings thereby to suppress common mode noise resulting from operation of said switching means, said voltage balancing means including first and second rectifying means respectively connected to said output terminals of said secondary winding in series thereto in the forward direction, and an output capacitor connected between both ends of the series connection of said first rectifying means, said secondary winding and said second rectifying means;

said electrostatic shield being connected to a zero potential point in the primary side circuit which includes said primary winding, said switching means and said input capacitor.

3. A DC-DC converter for remote power feeding which is connected via a power separating filter to a signal line on which an AC signal is superimposed on DC power, comprising:

an input capacitor connected to said power separating filter and supplied with the DC power separated by said power separating filter;

a transformer whose input and output sides float off ground, said transformer including a primary winding, a secondary winding, and an electrostatic shield between said primary and secondary windings, said primary winding being connected to said input capacitor, said primary winding being opened at its center winding point to provide two center terminals;

switching means connected between said two center terminals of said primary winding; and voltage balancing means operative to cause the AC voltage induced in a one half winding portion of one of said windings, relative to a center point on said one of said windings, to be substantially equal in potential and substantially opposite in polarity to the AC voltage induced in the other half winding portion of said one of said windings thereby to suppress common mode noise resulting from operation of said switching means, said voltage balancing means including rectifying means one side of which is connected to one end of said secondary winding, and an output capacitor connected between the other end of said secondary winding and the other side of said rectifying means;

said electrostatic shield being connected to a zero potential point in the secondary side circuit which includes said secondary winding, said rectifying means and said output capacitor.

4. A DC-DC converter for remote power feeding which is connected via a power separating filter to a signal line on which an AC signal is superimposed on DC power, comprising:

an input capacitor connected to said power separating filter and supplied with the DC power separated by said power separating filter;

a transformer whose input and output sides float off ground, said transformer including a primary winding, a secondary winding, and an electrostatic shield interposed between said windings, said primary winding being connected to a pair of input terminals and said secondary winding being coupled to a pair of output terminals;

first and second switching means connected respectively to said input terminals of said primary winding in series thereto, the opposing ends of the series connection of said first switching means, said primary winding and said second switching means being connected respectively to the opposite sides of said input capacitor; and voltage balancing means operative to cause the AC voltage induced in a one half winding portion of one of said windings, relative to a center point on said one of said windings, to be substantially equal in potential and substantially opposite in polarity to the AC voltage induced in the other half winding portion of said one of said windings thereby to suppress common mode noise resulting from operation of said switching means, said voltage balancing means including rectifying means connected to one of said output terminals of said secondary winding in series thereto, and an output capacitor connected between the opposing ends of the series connection of said secondary winding and said rectifying means;

said electrostatic shield layer being connected to a zero potential point in the secondary side circuit including said secondary winding, said rectifying means and said output capacitor.

* * * * *